(12) United States Patent
Kano et al.

(10) Patent No.: US 6,310,858 B1
(45) Date of Patent: Oct. 30, 2001

(54) FRAME RELAY SYSTEM

(75) Inventors: Shinya Kano; Akira Chugo, both of Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 0 days.

(21) Appl. No.: 09/040,682

(22) Filed: Mar. 18, 1998

(30) Foreign Application Priority Data

Jun. 18, 1997 (JP) .................................................. 9-161169

(51) Int. Cl.[7] .................................................. H04L 12/28
(52) U.S. Cl. .......................... 370/235; 370/410; 370/403
(58) Field of Search .................................. 370/405, 474, 370/392, 403, 410, 235, 397

(56) References Cited

U.S. PATENT DOCUMENTS

| | | | | |
|---|---|---|---|---|
| 5,293,379 | * | 3/1994 | Carr ........................................ | 370/474 |
| 5,602,839 | | 2/1997 | Annapareddy et al. . | |
| 5,675,741 | * | 10/1997 | Aggarwal et al. ..................... | 370/474 |
| 5,708,654 | * | 1/1998 | Arndt et al. .......................... | 370/405 |
| 5,787,082 | * | 6/1998 | Bennett et al. ....................... | 370/405 |
| 5,920,566 | * | 7/1999 | Hendel et al. ........................ | 370/392 |
| 5,991,300 | * | 11/1999 | Tappan .................................. | 370/392 |
| 6,097,718 | * | 8/2000 | Bion ..................................... | 370/410 |
| 6,147,970 | * | 11/2000 | Troxel .................................. | 370/235 |
| 6,157,651 | * | 12/2000 | Meares et al. ....................... | 370/403 |
| 6,167,051 | * | 12/2000 | Nagami et al. ...................... | 370/397 |

FOREIGN PATENT DOCUMENTS 5-336155   12/1993   (JP) .
7-303110   11/1995   (JP) .

* cited by examiner

*Primary Examiner*—Salvatore Cangialosi
(74) *Attorney, Agent, or Firm*—Rosenman & Colin, LLP

(57) ABSTRACT

A frame relay system relays a received frame having a destination address and a frame TTL indicating a term of life of the received frame. The frame relay system includes a routing table having entries, each of the entries indicating a relationship between a destination address and a control information item, a retrieving unit for retrieving the routing table based on a destination address included in the received frame, and a frame control unit for carrying out a decrement calculation of the frame TTL of the received frame when a period of time has elapsed from a time at which an entry hit in retrieving of the routing table by the retrieving unit was formed or updated is not equal to or greater than a predetermined value and for not carrying out the decrement calculation of the frame TTL when the period of time period is equal or greater than the predetermined value.

11 Claims, 23 Drawing Sheets

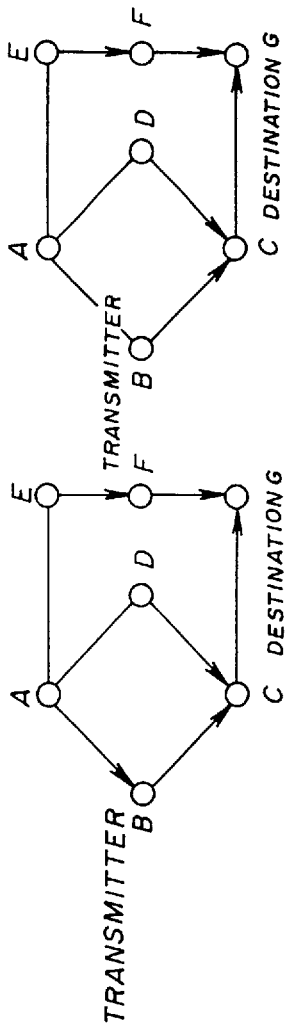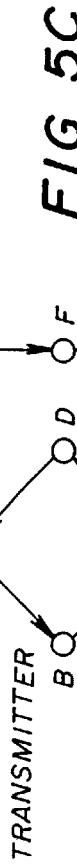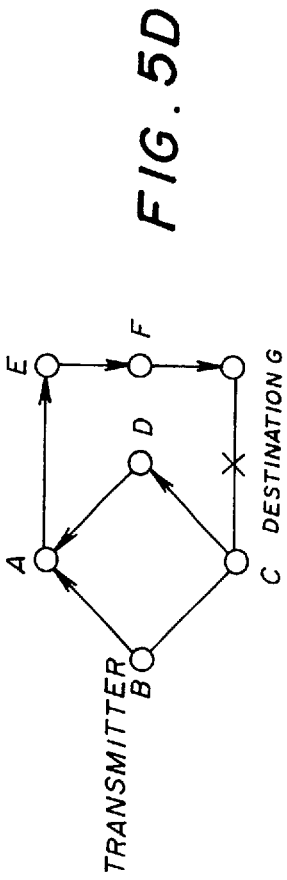
FIG. 5A NETWORK FORMATION
FIG. 5B PATH TO "G" (BEFORE TROUBLE OCCUR)
FIG. 5C PATH TO "G" (TRANSIENT)
FIG. 5D PATH TO "G" (RESTORED)

FIG. 11

| DESTINATION ADDRESS | OUTPUT PORT | UPDATING TIME |
|---|---|---|
| AAAAAAA | #1 | xx:xx:xx |
| BBBBBBB | #1 | yy:yy:yy |
| CCCCCCC | #2 | zz:zz:zz |
| DDDDDDD | #3 | uu:uu:uu |

| DESTINATION ADDRESS | OUTPUT PORT | FLAG | UPDATING TIME |
|---|---|---|---|
| AAAAAAAA | #1 | 1 | xx:xx:xx |
| BBBBBBBB | #1 | 1 | yy:yy:yy |
| CCCCCCCC | #2 | 0 | zz:zz:zz |
| DDDDDDDD | #3 | 1 | uu:uu:uu |

21a — DESTINATION ADDRESS
21b — OUTPUT PORT
21d — FLAG
21c — UPDATING TIME

FIG. 14
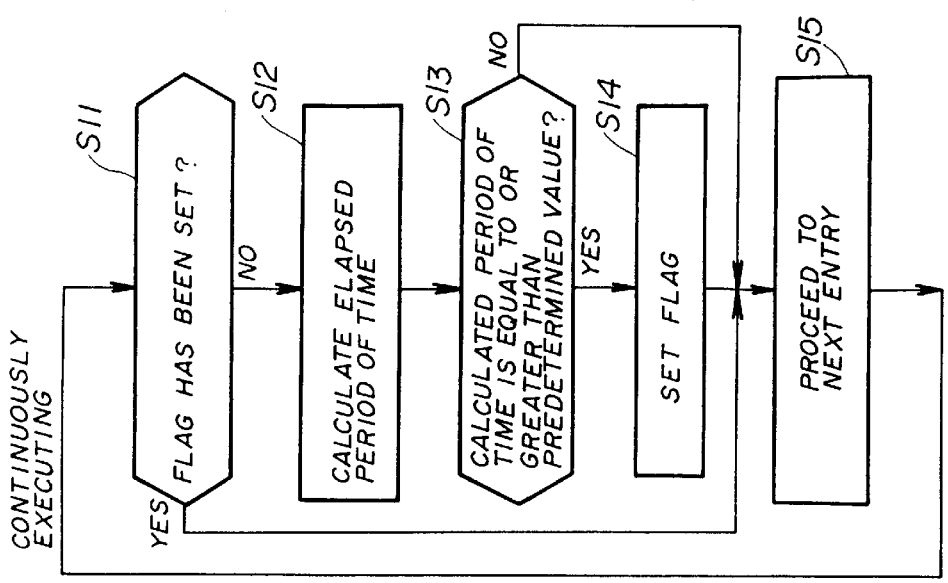
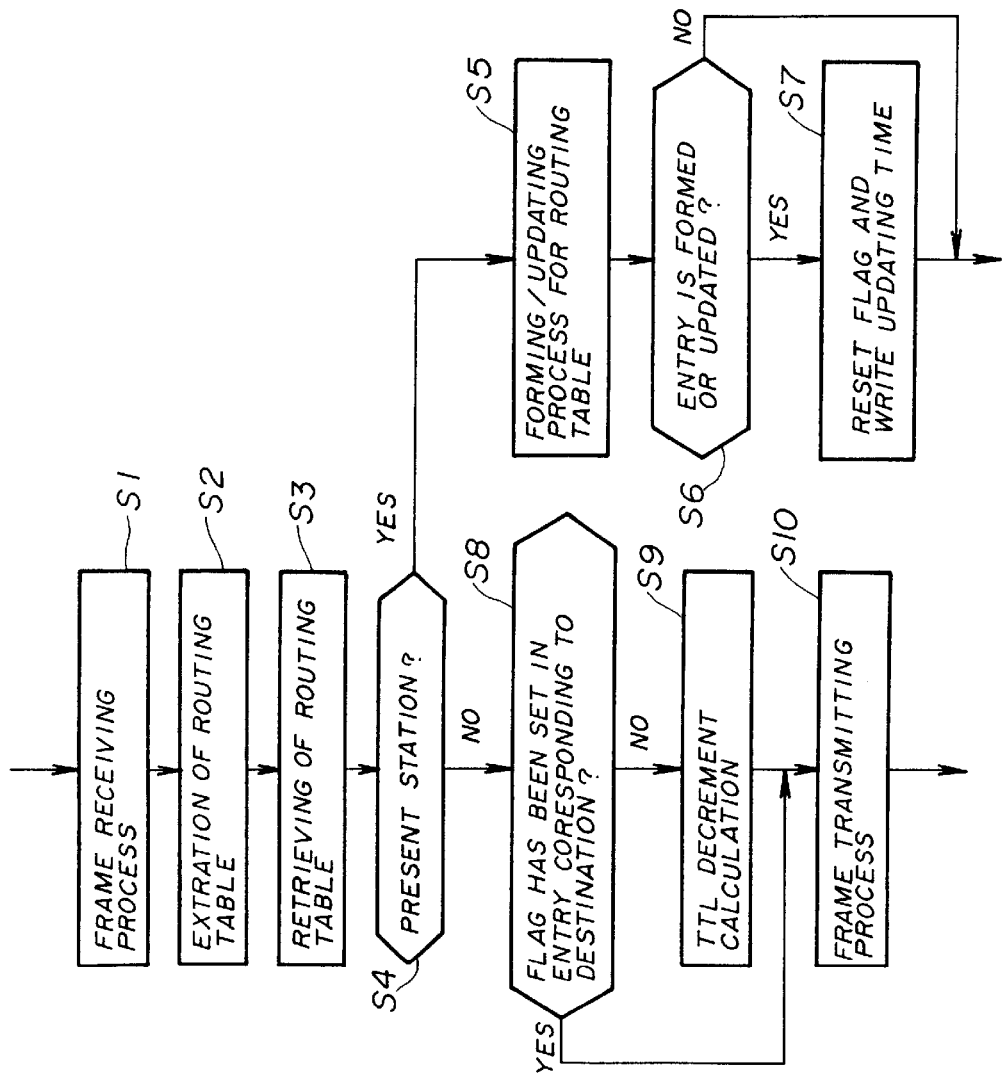

FIG. 15

| DESTINATION ADDRESS | OUTPUT PORT | FLAG | UPDATING TIME |
|---|---|---|---|
| AAAAAAAA | #1 | 1 | xx:xx:xx |
| BBBBBBBB | #1 | 1 | yy:yy:yy |
| CCCCCCCC | #2 | 0 | zz:zz:zz |
| DDDDDDDD | #3 | 1 | uu:uu:uu |

21a — DESTINATION ADDRESS
21b — OUTPUT PORT
21d — FLAG
21c — UPDATING TIME

FIG. 17

| DESTINATION ADDRESS (21a) | OUTPUT PORT (21b) | FLAG (21d) |
|---|---|---|
| AAAAAAAA | #1 | 1 |
| BBBBBBBB | #1 | 0 |
| CCCCCCCC | #2 | 0 |
| DDDDDDDD | #3 | 1 |

FIG. 19

| DESTINATION ADDRESS 21a | OUTPUT PORT 21b | FLAG 21d |
|---|---|---|
| AAAAAAA | #1 | 1 |
| BBBBBBB | #1 | 0 |
| CCCCCCC | #2 | 0 |
| DDDDDDD | #3 | 1 |

FIG. 21

| DESTINATION ADDRESS (21a) | OUTPUT PORT (21b) | COMPLETELY UPDATED FLAG (21d) | UPDATING FLAG (21e) |
|---|---|---|---|
| AAAAAAAA | #1 | 1 | — |
| BBBBBBBB | #1 | 0 | 1 |
| CCCCCCCC | #2 | 0 | 0 |
| DDDDDDDD | #3 | 1 | — |

FIG. 22

| DESTINATION ADDRESS (21a) | OUTPUT PORT (21b) | FLAG (21f) |
|---|---|---|
| AAAAAAAA | #1 | 1 |
| BBBBBBBB | #1 | 1 |
| CCCCCCCC | #2 | 0 |
| DDDDDDDD | #3 | 0 |

FRAME RELAY SYSTEM

BACKGROUND OF THE INVENTION

(1) Field of the Invention

The present invention generally relates to a frame relay system connecting networks to each other, particularly to a frame relay system which relays frames each of which has a destination address and a frame time-to-live (TTL) as control information. The frame TTL indicates the number of times which a frame can be relayed.

(2) Description of the Related Art

In a frame relay system connecting network to each other, a frame having a format as shown in FIG. 1 is used. That is, the frame has a destination address 1, a frame time-to-live (TTL) 2 and data 3.

A conventional communication is preformed in accordance with a procedure in which a transmission terminal transmits frames, each frame having the frame TTL set at a value, and the frame relay system decrements the value of the frame TTL when relaying each of the frames. The frame relay system has a unit for deleting a frame when the value of the frame TTL reaches zero "0". That is, each of the frames is provided with a term of life so that frames are not infinitely circulating through a network.

A decrement process of the frame TTL in the frame relay system is applied to all the frames which should be relayed. As a result, the delay time of the relay process is increased, so that the relay process is inhibited from being performed at a high speed.

FIG. 2 is a block diagram illustrating a conventional frame relay system. Referring to FIG. 2, the frame relay system has a frame receiving unit 4 and a frame transmitting unit 5. The frame receiving unit 4 receives frames from a network and converts a format of each of the received frames into a format which can be processed in the system. The frame transmitting unit 5 converts a format of each of frame processed in the system into a format which can be output to the network and outputs the processed frame to the network. A set of the frame receiving unit 4 and the frame transmitting unit 5 is provided for each of the networks to which the system is connected. In this example shown in FIG. 2, a set of the frame receiving unit 4 and the frame transmitting unit 5 is provided for each of the networks 1 and 2.

The frame relay system further has a frame relay control unit 10, a path control unit 20 and a destination address extracting unit 6. The frame relay control unit 10 is connected to the frame receiving unit 4 and the frame transmitting unit 5 and carries out a frame relay control process. The frame relay control unit 10 has a frame forwarding block 11 for forwarding frames to the network, a TTL decrement block 12 for decrementing the value of the frame TTL and a header-check-sum calculation block 13.

The path control unit 20 is connected to the frame relay control unit 10 and controls paths. The path control unit 20 has a routing table 21, a table retrieving block 22 and a table forming/updating block 23. The routing table 21 indicates a destination address of each frame and control information corresponding to the destination address. The table retrieving block 22 retrieves that routing table 21. The table forming/updating block 23 forms and updates the routing table 21.

The destination address extracting unit 6 extracts a destination address from each frame received by the frame receiving unit 4. The destination address extracted by the destination address extracting unit 6 is supplied to the path control unit 20.

The conventional frame relay system performs processes in accordance with procedures as shown in FIG. 3. A description will now be given, with reference to FIG. 3, of the frame relay operation.

The frame receiving unit 4 receives a frame from the network and converts the format of the frame into a format which can be processed in the system (a frame receiving process S1).

The destination address extracting unit 6 extracts a destination address from the frame received by the frame receiving unit 4 (S2). The table retrieving block 22 receives the destination address from the destination address extracting unit 6 and retrieves the routing table 21 based on the received destination address (S3). It is checked whether the received destination address corresponds to the present frame relay system (the present station) (S4). The routing table 21 indicates a relationship between destination addresses and output ports as shown in FIG. 4 so that an output port can be decided based on a destination address.

The routing table 21 is formed by deciding a path, namely an output port, corresponding to a destination address in a received path information frame.

When the destination address does not correspond to the present frame relay system, the TTL decrement block 12 decrements a value of the frame TTL to avoid infinitely circulating through the network. If the value of the frame TTL reaches zero "0", the frame is deleted.

The frame forwarding block 11 forwards the frame to the frame transmitting unit 5 corresponding to the output port decided by the table retrieving block 22.

The frame transmitting unit 5 corresponding to the output port converts the frame format used in the system into a frame format which can be output to the network and then outputs the frame to the network.

When it is determined, in step S4, that the destination address corresponds to the present frame relay system, the system determines whether the received frame is a path information frame (S5). If the received frame is the path information frame, the system forms or updates the routing table 21 (S6).

When the frame is relayed with the decrement of the value of the frame TTL, the process time is increased. Thus, to achieve the fast relay process, a method for relaying the frame without the decrement of the value of the frame TTL may be used.

Even if frames are relayed without the decrement of the value of the frame TTL, due to forwarding of frames in accordance with the routing table, the frames can be relayed without errors in a case where the network is formed in a tree-structure. However, if the network structure is complex so that a circular path exits in the network, frames may circulates through the network so as to not reach any stations.

A description will now be given of states where the frame circulation occurs.

(1) Change of Routing Table

Each frame relay system receives path information frames from an adjacent frame relay system and decides paths to which frames should be relayed. The routing table indicating the relationship between destination addresses and output ports is then formed (see FIG. 4). In a state where a sufficient time elapses from a start of services in the network and the network is in a stationary state, an output port corresponding to each of the destination address is uniquely decided in each frame relay system. In the stationary state, frames are relayed to paths in accordance with the routing table, so that the frames can reach the destinations without circulating through the network.

In cases where network equipment trouble and disconnection of a path in the network occur, relaying paths are changed based on information relating to the trouble included in the path information frame so that restoration of the relaying paths is attempted. In this case, if all the frame relay systems in the network simultaneously change the relaying paths, that is, if the routing tables are simultaneously updated in all the frame relay systems, the relay paths are restored without problems.

However, the routing tables are updated separately in the respective frame relay systems, and it takes a long time until the routing tables are updated in all the frame relay systems so that the network becomes in a stationary state. In a transition period until the network becomes in the stationary state, the circulating paths of the frames may occur, so that a frame transmitted in the transition period may be circulated through the network. A description will be given of an example of the circulation of the frame.

FIGS. 5A through 5D illustrates the circulation of the frames based on disagreement of the routing tables with each other. It is supposed that a frame is relayed from a frame relay system B to a frame relay system (hereinafter, referred to as a relay system) G in a network shown in FIG. 5A.

Each relay system receives a path information frame including path information from an adjacent relay system and obtains a shortest path to the relay system G. Paths from the respective relay systems to the relay system G are formed as shown in FIG. 5B.

In a case where frames are transmitted from the relay system B to the relay system G, the frames travel through a path (the relay system B→the relay system C→the relay system G).

In a case where communication between the relay systems C and G is suspended due to a problem occurring in a transmission line (a trouble position is indicated by an x shown in FIG. 5C), the relay system C informs an adjacent relay system, using a path information fame, that a problem has occurred in a transmission line between the relay systems C and G. The difference between receiving timings of the path information frames and the difference between updating process for the routing tables in relay systems create the disagreement of the path information in the network. For example, the routing tables of only the relay systems C and D are updated and the routing tables of other relay systems have not yet been updated.

In this case, when a frame is transmitted from the relay system B to the relay system G again, the frame is circulated through a path (the relay system B→the relay system C→the relay system D→the relay system A→the relay system B). FIG. 5C illustrates the circulation of the frame in the transition period.

When the network has been restored, as shown in FIG. 5D, frames are transmitted through a path (the relay system B→the relay system A→the relay system E→the relay system F→the relay system G).

As has been described above, if a frame is not deleted based on a value of the frame TTL of the frame, the frame which is circulated in the network can not be eliminated. That is, in a case where the decrement process of the value of the frame TTL is not performed, although the fast relay process can be attempted, the frame which is circulated in the network can not be eliminated.

(2) Static Path

In the relay system, there is a path statically decided by an administrator other than a path decided based on the path information frame. Hereinafter, the path statically decided is referred to as a static path. If the administrator generates, for any reason, a static path which is a circulating path, frames are circulated in the network.

As has been described above, although the circulation of frames through the network can be avoided by the decrement process of the value of the frame TTL, the relay process is delayed. As a result, the fast relay process can not be attempted.

On the other hand, although the fast relay process can be attempted by relaying frames without the decrement process of the value of the frame TTL, a frame can not eliminated if the circulation of the frame occurs.

In addition, although the fast relay process can be attempted by relaying frames without the decrement process of the value of the frame TTL, an area to which frames are relayed can not be limited.

Further, although the fast relay process can be attempted by relaying frames without the decrement process of the value of the frame TTL, applications using the decrement of the value of the frame TTL can not be used.

SUMMARY OF THE INVENTION

Accordingly, a general object of the present invention is provide a novel and useful frame relay system in which the disadvantages of the aforementioned prior art are eliminated.

A specific object of the present invention is to provide a frame relay system by which the fast relay process can be attempted.

Another object of the present invention is provide a frame relay system by which the frames can be prevented from being circulated in the network.

The above objects of the present invention are achieved by a frame relay system which relays a received frame having a destination address and a frame TTL indicating a term of life of the received frame, the system comprising: a routing table having entries, each of the entries indicating a relationship between a destination address and a control information item; retrieving means for retrieving the routing table based on a destination address included in the received frame; and frame control means for carrying out a decrement calculation of the frame TTL of the received frame when a period of time elapsed from a time at which an entry hit in retrieving of the routing table by the retrieving means was formed or updated is not equal to or greater than a predetermined value and for not carrying out the decrement calculation of the frame TTL when the period of time period is equal or greater than the predetermined value.

According to the present invention, only in a case where a time period that has elapsed from a time at which the routing table is formed or updated does not exceed the predetermined time, the decrement calculation of the frame TTL is carried out. Thus, the fast relay operation can be carried out and the frames are prevented from being circulated through the network.

Each of the entries in the routing table may have an area in which a time at which the entry is formed or updated should be written. In this case, the frame control means may include: means for writing a forming/updating time at which an entry is formed or updated in the routing table in the area of the entry when the entry is formed or updated; and calculation means for, in a frame relay operation, calculating the period of time elapsed from a time at which an entry hit in retrieving of the routing table was formed or updated based on the forming/updating time of the entry. In this aspect of the present invention, the frame control means carries out the decrement calculation of the frame TTL when the calculated period of time is equal to or less than the predetermined value. As a result, the fast relay operation can be carried out and the frames can be prevented from being circulated through the network.

Each of the entries in the routing table may have a first area in which a time at which the entry is formed or updated should be written and a second area in which a flag indicating that an updating process for the entry has been completed should be written. In this case, the frame control means may includes: means for writing a forming/updating time at which an entry is formed or updated in the routing table in the area of the entry when the entry is formed or updated and resetting the flag; and calculation means for, in a frame relay operation, calculating the period of time elapsed from a time at which an entry hit in retrieving of the routing table was formed or updated based on the forming/updating time of the entry if the flag of the entry has not yet been set. In this aspect of the present invention, the frame control means carries out the decrement calculation of the frame TTL when the calculated period of time is equal to or less than the predetermined value, and the frame control means does not carry out the decrement calculation of the frame TTL and sets the flag when the calculated period of time is equal to or greater than the predetermined value. As a result, the fast relay operation can bee carried out and the frames can be prevented from being circulated through the network.

Each of the entries in the routing table may have a first area in which a time at which the entry is formed or updated should be written and a second area in which a flag indicating an updating process for the entry has been completed should be written. In this case, the frame control means may include: means for writing a forming/updating time at which an entry is formed or updated in the routing table in the area of the entry when the entry is formed or updated and resetting the flag; calculation means for monitoring flags for the respective entries in the routing table and calculating a period of time elapsed from a time at which an entry for which the flag has not yet been set was formed or updated; and means for setting the flag of an entry in which the calculated period of time is equal to or greater than a predetermined value. In this aspect of the present invention, the frame control means carries out the decrement calculation of the frame TTL when the flag of the entry hit in retrieving of the routing table has not yet been set. As a result, the fast relay operation can be carried out and the frame can be prevented from being circulated through the network.

Each of the entries in the routing table may have an area in which a flag indicating that an updating process for the entry has been completed should be written. In this case, the frame relay control means may include: means for resetting the flag of an entry when the entry is formed or updated; and means for setting flags for all the entries at predetermined intervals. In this aspect of the present invention, the frame relay means carries out the decrement calculation of the frame TTL when the flag of an entry hit in retrieving of the routing table has not yet been set in a frame relay operation. As a result, the fast relay operation can be carried out and the frames can be prevented from being circulated through the network.

Each of the entries in the routing table may have an area in which a flag indicating that an updating process for the entry has been completed should be written. In this case, the frame relay control means may include: a timer; means for resetting the flag of an entry and starting the timer from zero when the entry is formed or updated; and means for setting the flags of all the entries in the routing table when a value of the timer reaches a predetermined value. In this aspect of the present invention, the frame relay control means carries out the decrement calculation of the frame TTL when the flag of an entry hit in retrieving of the routing table has not yet been set in a frame relay operation. As a result, the fast relay operation can be carried out and the frames can be prevented from being circulated through the network.

Each of the entries in the routing table may have a first area in which a first flag indicating that a updating process for the entry has been completed should be written and a second area in which a second flag indicating that the entry is being updated. In this case, the frame relay control means may include: means for resetting the first and second flags of an entry when the entry is formed or updated; means for monitoring the routing table; means for setting the second flag of an entry for which it is detected based on a monitoring result that neither the first flag nor the second flag has not yet been set; and means for setting the first flag of an entry for which it is detected based on the monitoring result that only the first flag has not yet been set. In this aspect of the preset invention, the frame relay control means carries out the decrement calculation of the frame TTL when the first flag of an entry hit in retrieving of the routing table has not yet been set in a frame relay operation. As a result, the fast relay operation can be carried out and the frames can be prevented from being circulated.

Each of the entries in the routing table may have an area in which a flag indicting that the entry corresponds to a static path should be written. In this case, the frame relay control means may include: means for setting the flag of an entry when an administrator of the system specifies the entry corresponding to the static path. In this aspect of the present invention, the frame relay control means carries out the decrement calculation of the frame TTL when the flag of an entry hit in retrieving of the routing table has been set in a frame relay operation. As a result, frames which should be relayed to the static path can be prevented from being circulated through the network.

The frame relay control means may include: means for determining whether the received frame includes a multicast address or a specific terminal address which type of address indicates that the decrement calculation of the frame TTL should be carried out for the received frame or whether the received frame is a frame belonging to a specific protocol. In this aspect of the present invention, the frame relay control means carries out the decrement calculation of the frame TTL when the means determines that the received frame includes the multicast address or the specific terminal address or that the received frame is the frame belonging to the specific protocol. As a result, the disadvantage caused by not carrying out the decrement calculation of the frame TTL can be eliminated.

Each of the entries in the routing table may have an area in which a flag indicating that the decrement calculation of the frame TTL should be compulsorily carried out. In this case, the frame control means may include: means for setting the flag of an entry corresponding to a path to which a frame should be relayed after the decrement calculation of the frame TTL is carried out. In this aspect of the present invention, the frame relay control means carries out the decrement calculation of the frame TTL when the flag of an entry hit in retrieving of the routing table has been set in a frame relay operation. As a result, the disadvantage caused by not carrying out the decrement calculation of the frame TTL can be eliminated.

The above frame relay system may further includes a table separated from the routing table, the table indicating that each of the output ports is a port for which the decrement calculation of the frame TTL should be carried out. In this aspect of the present invention, the frame relay control means carries out the decrement calculation of the frame TTL when it is determined with reference to the table that an output port decided by retrieving of the routing table is the port for which the decrement calculation of the frame TTL should be carried out. As a result, the disadvantage caused by not carrying out the decrement calculation of the frame TTL can be eliminated.

BRIEF DESCRIPTION OF THE DRAWINGS

Other objects, features and advantages of the present invention will be apparent from the following description when read in conjunction with the accompanying drawings, in which:

FIGS. 5A, 5B, 5C and 5D are diagrams illustrating circulation of frames based on disagreement of routing tables;

FIG. 11 is a diagram illustrating a routing table used in the first example of the processes;

FIG. 13 is a diagram illustrating a routing table used in the second example of the processes;

FIG. 14 is flowchart illustrating a third example of processes in the frame relay system;

FIG. 15 is a diagram illustrating a routing table used in the third example of the processes;

FIG. 17 is a diagram illustrating a routing table used in the fourth example of the processes;

FIG. 19 is a diagram illustrating a routing table used in the fifth example of the processes;

FIG. 21 is a diagram illustrating a routing table used in the sixth example of the processes;

FIG. 22 is a diagram illustrating another routing table;

DESCRIPTION OF THE PREFERRED EMBODIMENTS

Figure 2:
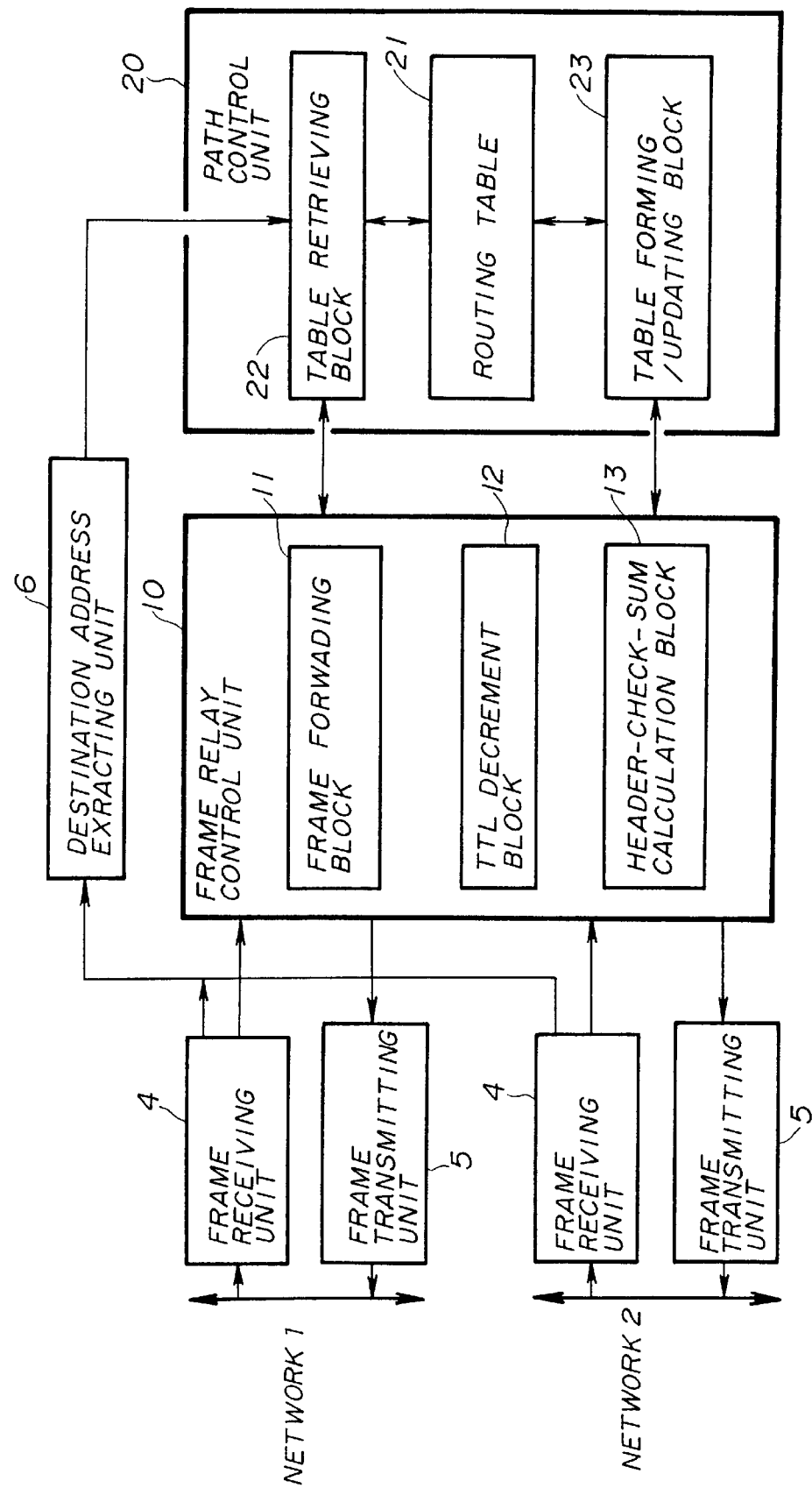
FIG. 2 is a block diagram illustrating a conventional frame relay system.
Figure 3:
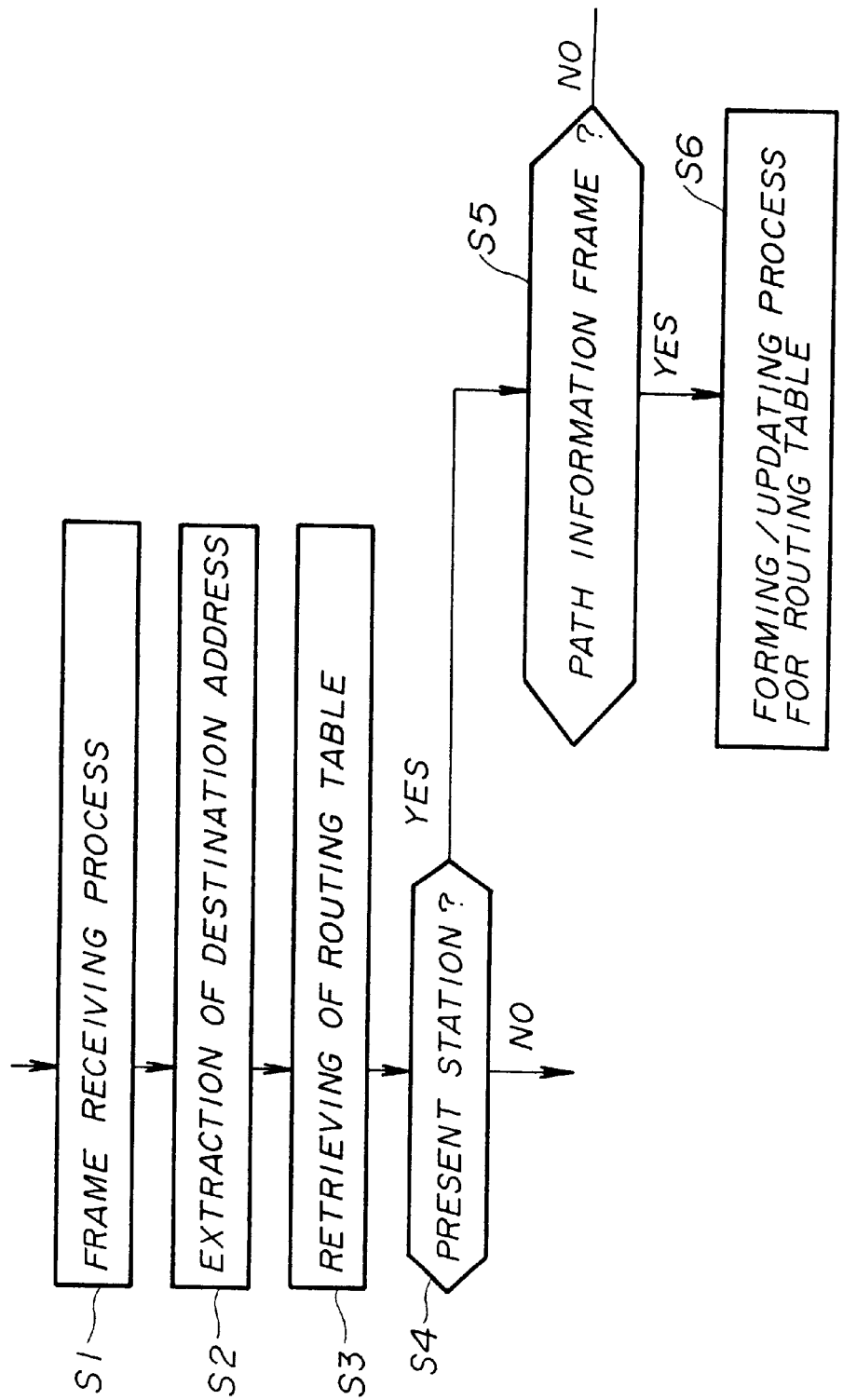
FIG. 3 is a flowchart illustrating procedures of operations of the conventional frame relay system.
Figure 6:
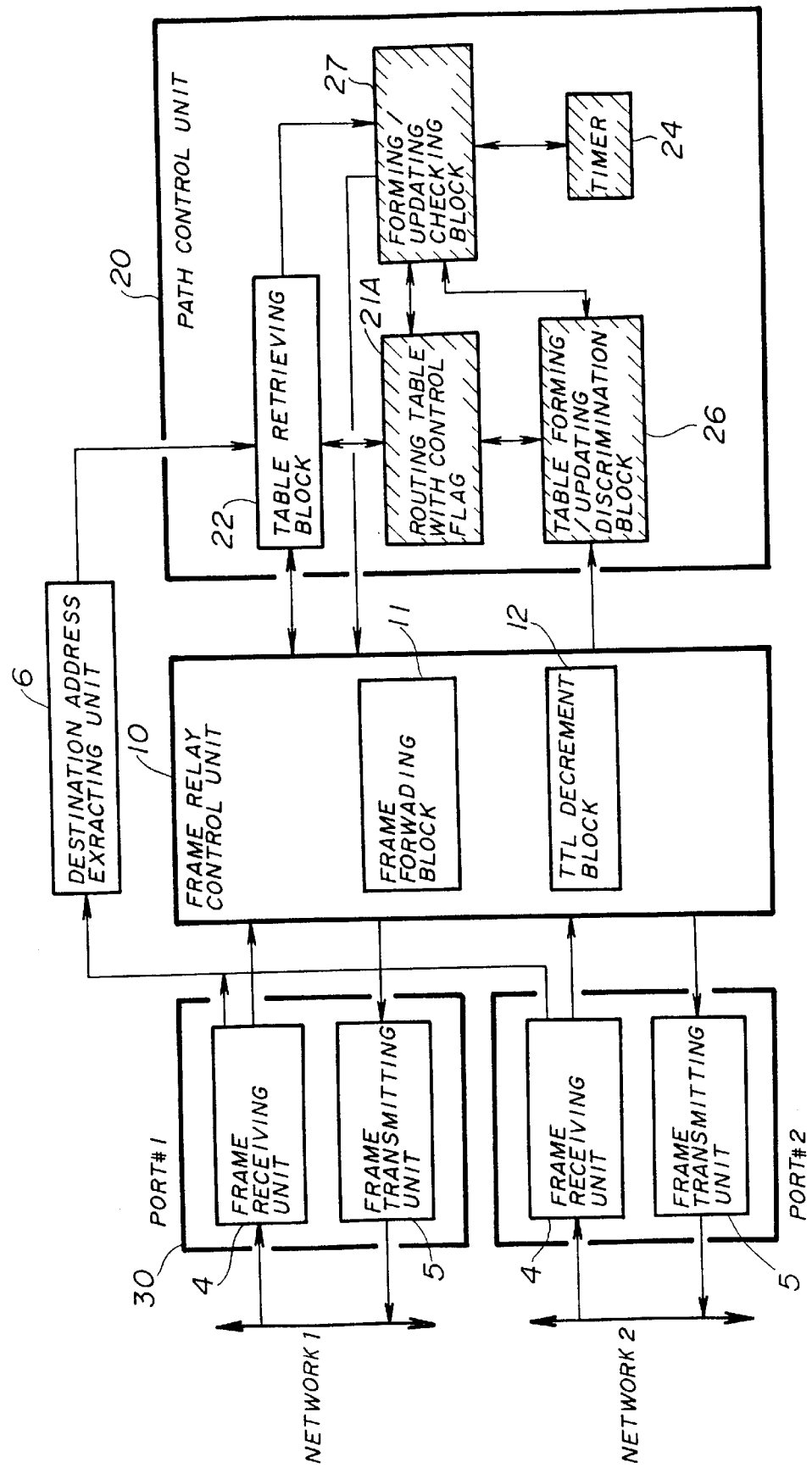
FIG. 6 is a block diagram illustrating a frame relay system according to a first embodiment of the present invention.

A description will be given, with reference to FIG. 6, of a frame relay system according to a first embodiment of the present invention. In FIG. 6, those parts which are the same as those shown in FIG. 2 are given the same reference numbers.

Referring to FIG. 6, two ports 30 (#1 and #2) respectively connected to networks are provided. The number of ports is not limited to this.

Each of the ports 30 has the frame receiving unit 4 and the frame transmitting unit 5. The frame receiving unit 4 receives frames from the network and converts the format of each of the frames into a frame format which can be processed in the system. The frame transmitting unit 5 converts the frame format of each processed frame into a format which can be output to the network and outputs the processed frame to the network.

The path control unit 20 controls paths. The path control unit 20 has a routing table 21A, the table retrieving block 22, a table forming/updating discrimination block 26, a timer 24 and a forming/updating checking block 25. The routing table 21A has destination addresses of frames and control information (e.g., various flags) corresponding to the destination addresses. The table retrieving block 22 retrieves the routing table 21A using a destination address of a received frame as a key and decides an output port. The table forming/updating discrimination checking block 26 forms and updates the routing table 21A based on a received path information frame. The timer 24 is used to check whether a period of time has elapsed from a time at which an entry was formed or updated in the routing table 21A is equal to or greater than a predetermined value. The forming/updating checking block 25 checks, with reference to the timer 24 and the routing table 21A, whether a period of time that has elapsed from a time at which an entry was formed or updated in the routing table 21A is equal to or greater than the predetermined value so that a forming/updating process of the routing table 21A is completed.

The frame relay control unit 10 carries out the frame relay control. The frame relay control unit 10 has the frame forwarding block 11 and the TTL decrement block 12. The frame forwarding block 11 forwards frames from the frame receiving unit 4 of the input port to the frame transmitting unit 5 of the output port in accordance with instructions from the table retrieving block 22. The TTL decrement block 12 carries out the TTL decrement calculation of the frame TTL of frames in accordance with instructions from the forming/updating checking block 25. The destination address extracting unit 6 extracts a destination address of a frame from the frame receiving unit 4 and supplies it to the table retrieving block 22.

The path control unit 20 has the following function. When a period of time that has elapsed from a time at which an entry is hit in retrieving of the routing table 21, based on a destination address of a received frame, was formed or updated is not equal to or greater than the predetermined value, the TTL decrement calculation of the frame TTL of the frame to relayed is carried out. On the other hand, when a period of time that has elapsed from the time at which an entry is hit in retrieving the routing table 21 is equal to or greater than the predetermined value, the TTL decrement calculation of the frame TTL of the frame is not carried out.

In the present invention, based on whether or not a period of time elapsed from a time at which an entry of the routing table 21A was formed or updated is equal to or greater than the predetermined value, based on whether or not an output path of a frame is a relaying path decided by an administrator, based on whether or not a received frame has an address for which it is decided by an administrator that the TTL decrement calculation should be carried out or belongs to a protocol, and whether or not an output port for which it is determined by an administrator that the decrement calculation should be carried out is obtained, it is determined whether the TTL decrement calculation should be carried out and the frame is relayed.

In the stationary state in which the network topology is not changed, the circulation of the frame does not occur. In a case where the network topology is changed and the relaying path is changed, that is, in a case where the routing table 21A is updated, the circulation of the frame occurs.

Thus, in the present invention, in the stationary state where entries of the routing table 21A are not updated, the TTL decrement calculation is not carried out. On the other hand, when a period of time has elapsed from a time at which an entry of the routing table 21A was formed or updated is equal to or less than the predetermined time, the TTL decrement block carries out the TTL decrement calculation. As a result, the fast relay process can be attempted and the frames can be prevented from being circulated through the network.

A description will now be given of the frame relay system according to a second embodiment of the present invention.

Figure 7:
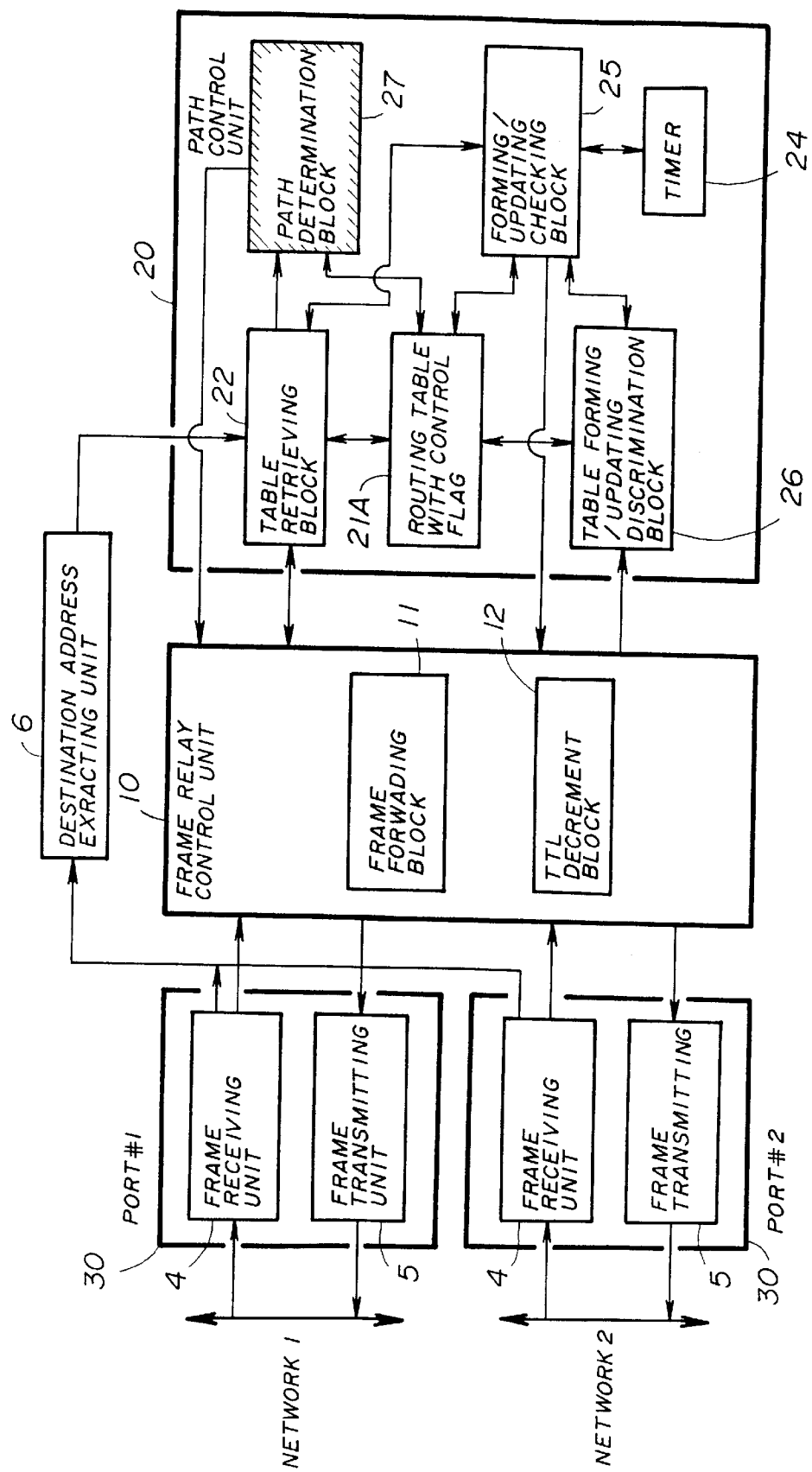
FIG. 7 is a block diagram illustrating a frame relay system according to a second embodiment of the present invention.

The frame relay system according to the second embodiment of the present invention is formed as shown in FIG. 7. In FIG. 7, those parts which are the same as those shown in FIG. 6 are given the same reference numbers. In the frame relay system shown in FIG. 6, when an output port of a received frame corresponds to a static path set by an administrator, the frame can not be prevented from being circulated through the network.

Thus, in the frame relay system according to this embodiment, when the output port of the received frame corresponds to the static path set by the administrator, the TTL decrement calculation is always carried out. Referring to FIG. 7, the path control unit 20 further has a static path determination block 27. The path determination block 27 determines whether an output path is a static path and supplies instructions for the TTL decrement calculation to the frame relay control unit 10 based on a determination result. Other elements shown in FIG. 7 are the same as those shown in FIG. 6.

A description will be given of the frame relay system according to a third embodiment of the present invention.

Figure 8:
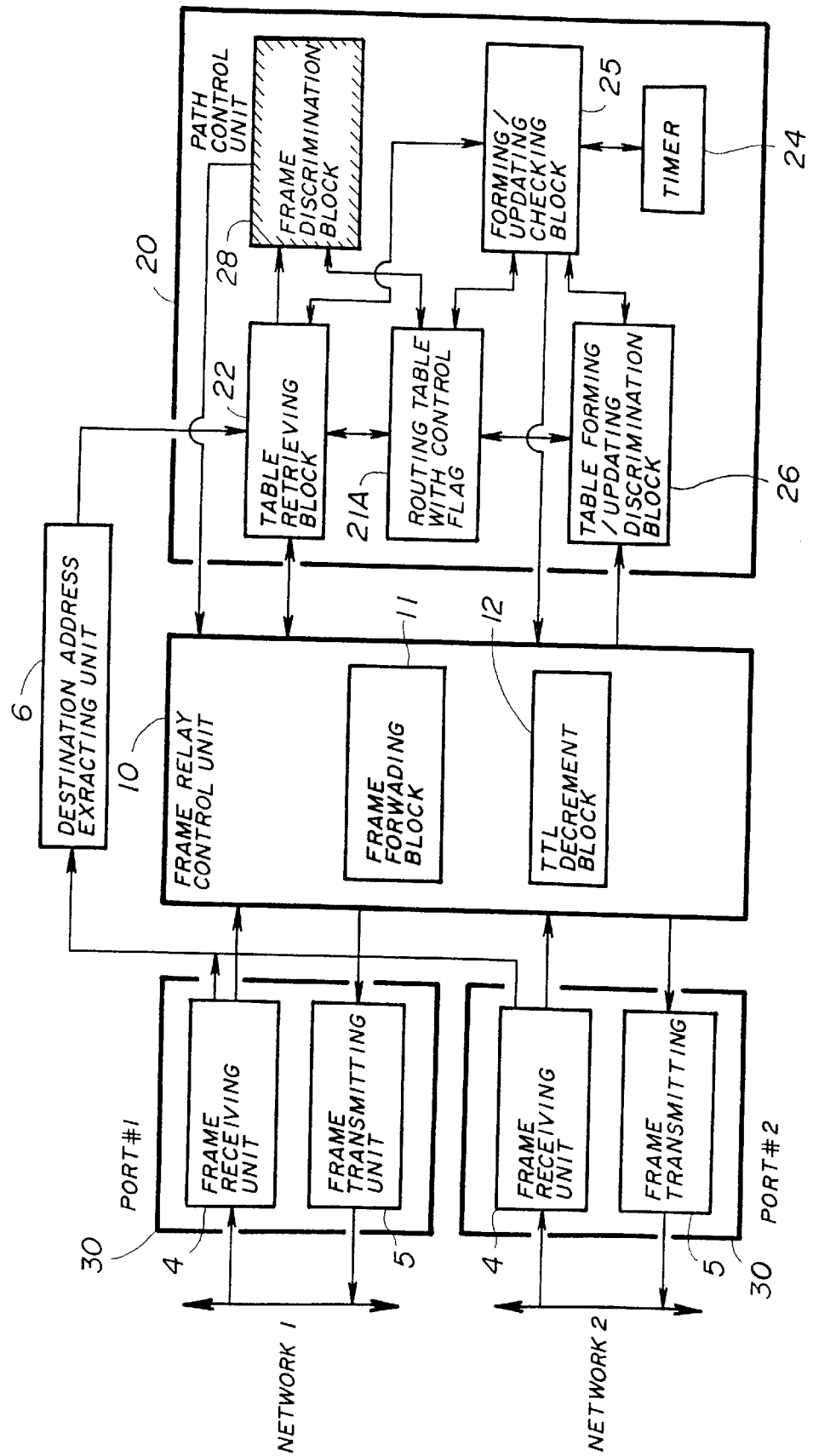
FIG. 8 is a block diagram illustrating the frame relay system according to a third embodiment of the present invention.

The frame relay system according to the third embodiment is formed as shown in FIG. 8. In FIG. 8, those parts which are the same as those shown in FIG. 6 are given the same reference numbers. In the frame relay system according to this embodiment, disadvantages caused by not performing the TTL decrement calculation in the frame relay system which is relaying frames are eliminated.

The feature of the conventional system by which the TTL decrement calculation is carried out is used. A network system may be formed in which an area in which a frame having the frame TTL set at a value can be relayed is limited. In this case, if a frame relay system in which the TTL decrement calculation is not carried out is provided in the area, the frame may be relayed to an area which is not desired by an operator of the transmission terminal.

Thus, in the frame relay system according to this embodiment, in a case where a frame having a specific address and a frame belonging to a specific protocol are relayed, the TTL decrement calculation is carried out. Referring to FIG. 8, the path control unit 20 further has a frame discrimination block 28. The frame discrimination block 28 discriminates the frame having the specific address and the frame belonging to the specific protocol from other kinds of frames. The frame discrimination block 28 supplies, based on the discrimination result, instructions for carrying out the TTL decrement calculation to the frame relay control unit 10. Other elements shown in FIG. 8 are the same as those shown in FIG. 6.

A description will now be given, with reference to FIG. 9, of the frame relay system according to a fourth embodiment.

Figure 9:
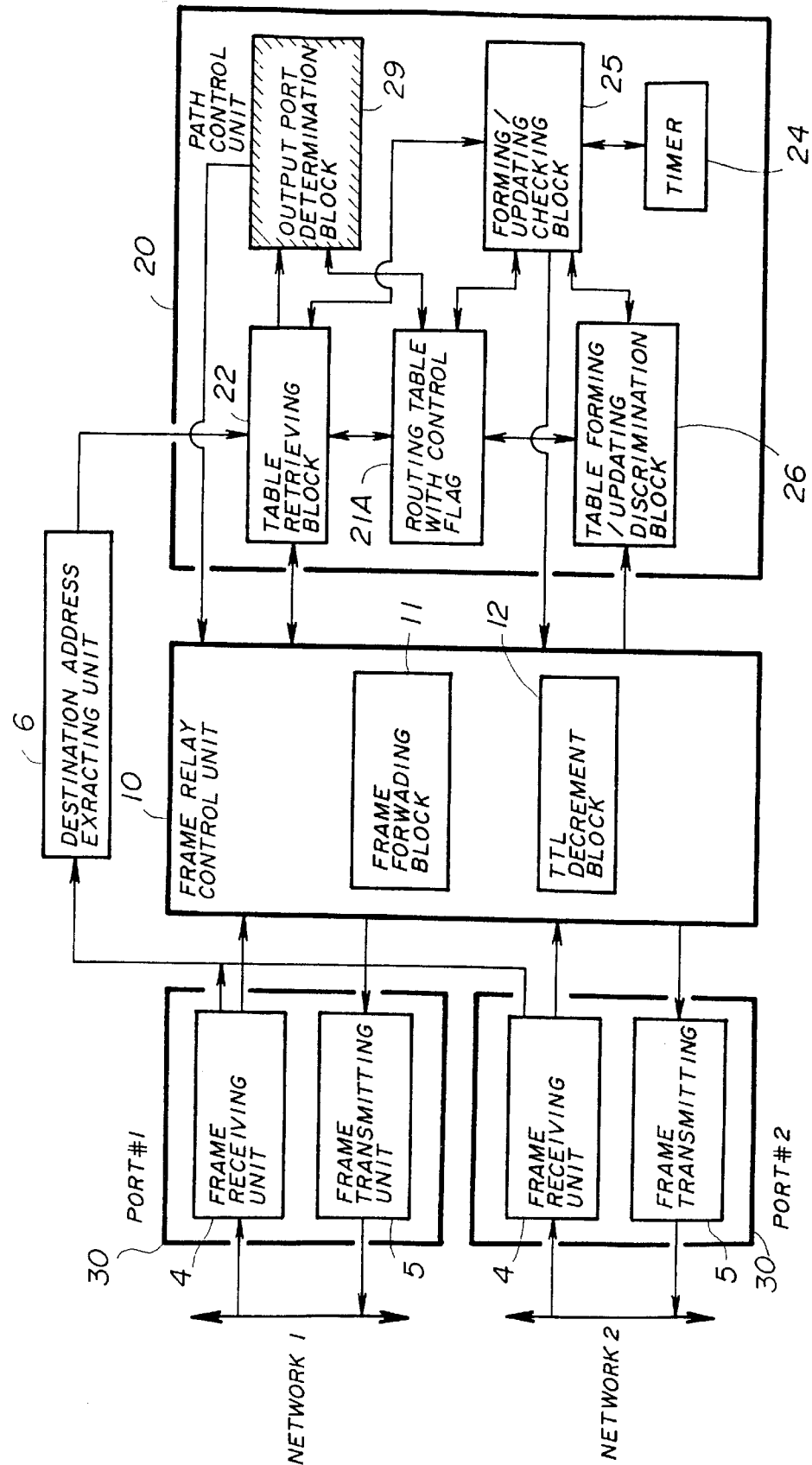
FIG. 9 is a block diagram illustrating the frame relay system according to a fourth embodiment of the present invention.

The frame relay system according to the fourth embodiment of the present invention is formed as shown in FIG. 9. In FIG. 9, those parts which are the same as those shown in FIG. 6 are given the same reference numbers. In the frame relay system according to this embodiment, disadvantages caused by not performing the TTL decrement calculation in the frame relay system which is relaying frames are eliminated.

For example, some kinds of application software for checking states of the network are used under a condition in which the TTL decrement calculation is carried out in each frame relay system. These kinds of application are not normally operated under a condition in which the TTL decrement calculation is not carried out in a frame relay system.

However, in a case where frames to be relayed to a destination use the application software having the above property, an administrator carries out the TTL decrement calculation for all the frames to be relayed to the destination, so that the operations can be guaranteed.

Thus, the frame relay system is provided with a function for compulsorily carrying out the TTL decrement calculation when a frame is relayed to a specific path. The specific path can be decided by the administrator of the relay system. Referring to FIG. 9, the path control unit 20 further has an output port determination block 29. The output port determination block 29 determines whether a port used to output frames is a port which requires the TTL decrement calculation. The output port determination block 29 supplies instructions, based on the determination result, for carrying out the TTL decrement calculation to the frame relay control unit 10. Other elements shown in FIG. 9 are the same as those shown in FIG. 6.

A description will now be given of examples of operations of the relay system. The relay system used is one of those shown in FIGS. 6 through 9.

(1) The Example 1

In this example, an area in which a time an entry is formed or updated should be written is provided in each entry in the routing table. When an entry (a path) is formed or updated, a time at which the entry is formed or updated (a forming/updating time) is written in the area. When a frame is relayed, a period of time that has elapsed from a time at which an entry hit in retrieving of the routing table was formed or updated is calculated based on the forming/updating time written in the area of the entry. When the calculated period of time is equal to or less than a predetermined value, the TTL decrement calculation is carried out. For every frame to be relayed, the period of time is calculated. In the examples 1 through 6, the frame relay system as shown in FIG. 6 is used.

Figure 4:
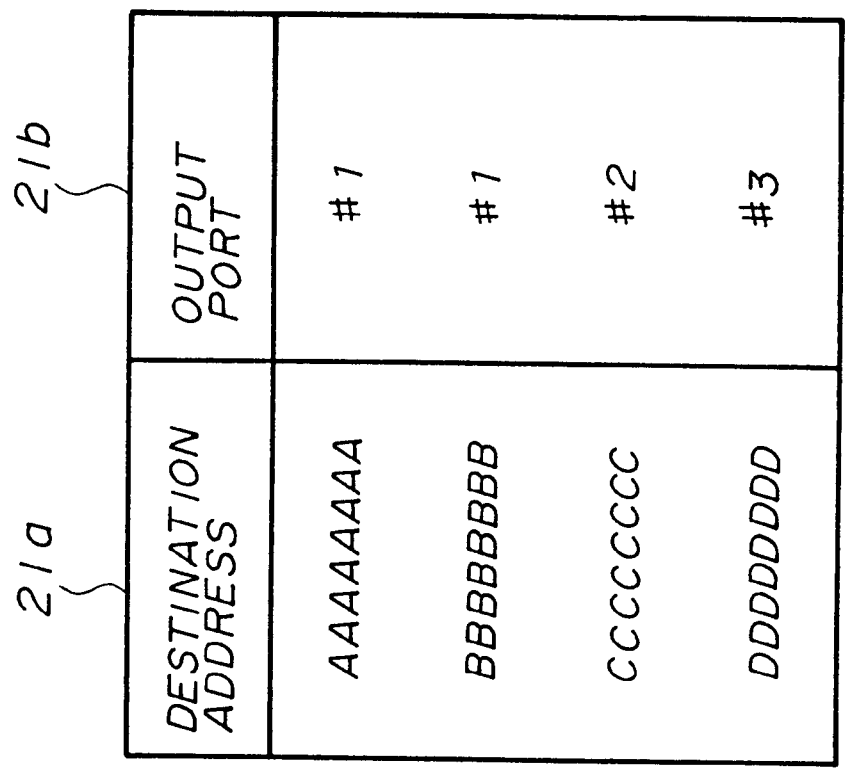
FIG. 4 is a diagram illustrating a routing table.
Figure 10:
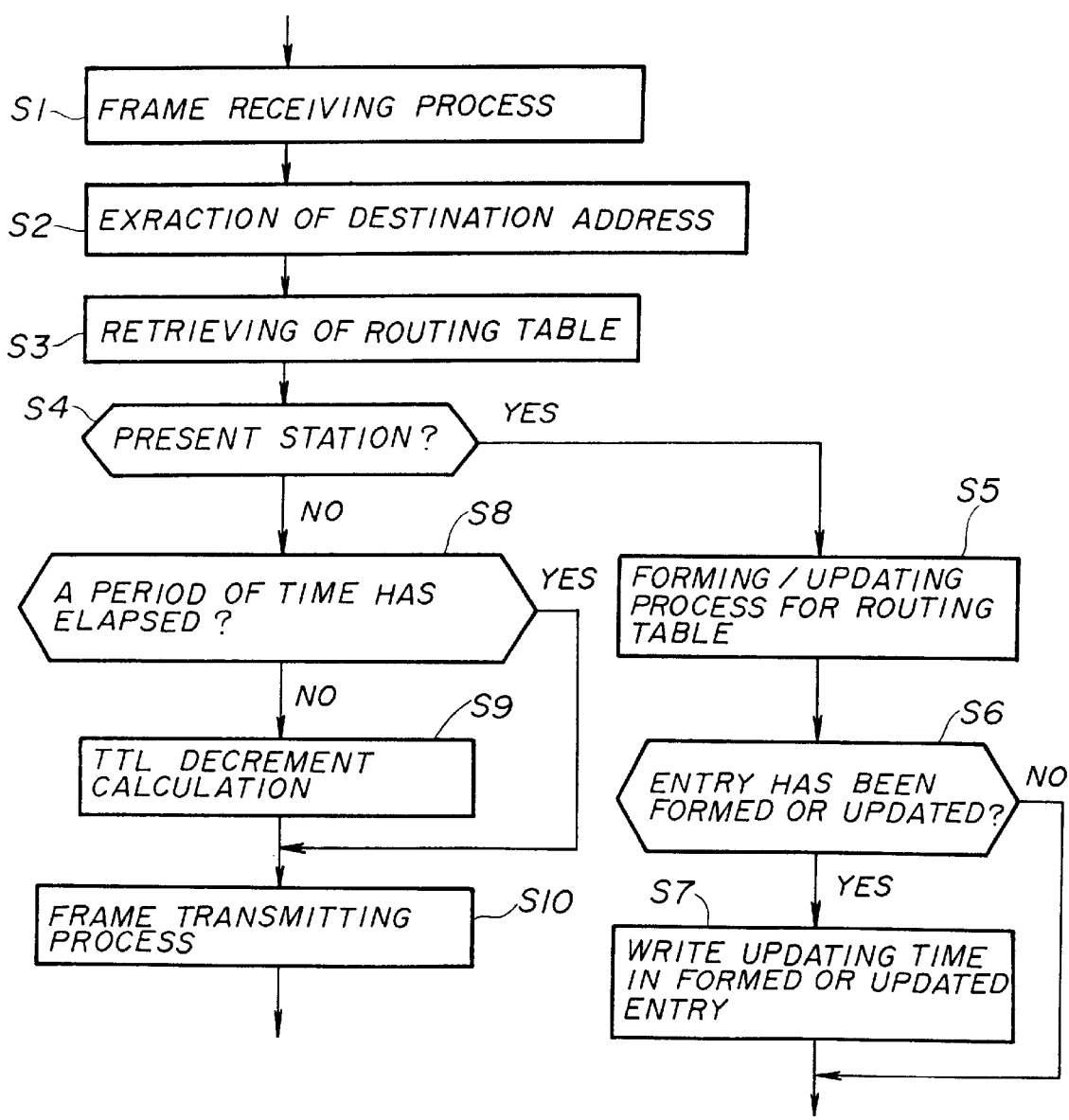
FIG. 10 is a flowchart illustrating a first example of processes in the frame relay system.

In the example 1, a process is executed in accordance with a procedure shown in FIG. 10. In this example, the routing table 21A is formed as shown in FIG. 11. The routing table 21A has destination addresses and the output ports (see FIG. 4) and further has an area in which a forming/updating time for each entry (including a set of a destination address and a corresponding output port) should be written. Referring to FIG. 11, the routing table is provided with a destination address area 21a, an output port area 21b and an updating time area 21c.

(Updating of the Routing Table)

The frame receiving unit 4 carries out a receiving process for receiving a frame from the network and converting the frame format of the received frame into a frame format suitable for the system (S1).

The destination address extracting unit 6 extracts a destination address from the received frame (S2).

The table retrieving block 22 retrieves the routing table 21A indicating the relationship between the destination addresses and the output port using the destination address extracted from the received frame as a key (S3).

It is then checked, based on a retrieving result, whether the received frame is a path information frame for the present system (S4).

If the received frame is a path information frame for the present system, the table forming/updating discrimination block 26 updates the routing table 21A (S5).

Further, it is checked whether an entry in the routing table 21A has been formed or updated (S6). If an entry has been formed or updated, the table forming/updating discrimination block 26 writes a forming/updating time in the routing table 21A with reference to the timer 24.

(The Frame Relaying Process)

The frame receiving unit 4 receives a frame from the network and converts the frame format of the received frame into a frame format suitable for the system (S1).

The destination address extracting unit 6 extracts a destination address from the received frame (S2).

The table retrieving block 22 retrieves the routing table 21A indicating the relationship between the destination addresses and the output port using the destination address extracted from the received frame as a key (S3). It is then checked whether the received frame is a frame to be processed in the present system (S4).

If the received frame is not a frame to be processed in the present system, the table retrieving block 22 decides an output port corresponding to the destination address from the routing table 21A. The forming/updating checking block 25 reads out a forming/updating time of an entry hit in the retrieving process from the routing table 21A. The forming/updating checking block 25 then calculates a period of time that has elapsed from a time at which the entry was formed or updated by comparing the present time indicated by the timer 24 and the forming/updating time (S8).

In a case where the calculated period of time has not yet reached a predetermined value, the forming/updating checking block 25 applies instructions for the TTL decrement calculation to the frame relay control unit 10.

When the frame relay control unit 10 receives the instructions from the forming/updating checking block 25, the frame relay control unit 10 causes the TTL decrement block 12 to carry out the TTL decrement calculation (S9). Frame data is then supplied to the frame transmitting unit 5 of the output port which has been decided by the table retrieving block 22.

The frame transmitting unit 5 converts the frame format of the frame supplied from the frame forwarding block 11 of the frame relay control unit 10 into a frame format suitable for the network and outputs the frame to the network (S10).

According to the example 1, in a case where a period of time has elapsed from a time at which an entry hit in the retrieving process for the routing table was formed or updated is equal to or less than the predetermined value, the TTL decrement calculation is carried out. Thus, the fast relay process can be performed and the frames can be prevented from being circulated through the network.

(2) The Example 2

In this example, an area in which a time at which an entry is formed or updated is written and an area in which a flag indicating that the updating process has been completed are provided in each entry in the routing table. When an entry (a path) is formed or updated, a time at which the entry is formed or updated (a forming/updating time) is written in the area and the flag is reset. In the frame relaying process, only when the flag of an entry hit in the retrieving of the routing table is not set, the period of time that has elapsed from the forming/updating time is calculated. Only when the calculated period of time is equal to or less than a predetermined value, the TTL decrement calculation is carried out. When the calculated period of time is greater than the predetermined value, the TTL decrement calculation is not carried out and the flag is set. The periods of time for all the frames to be relayed are not calculated. It is determined whether the flag in each entry is set, and the periods of time for only entries which have been updated are calculated.

Figure 12:
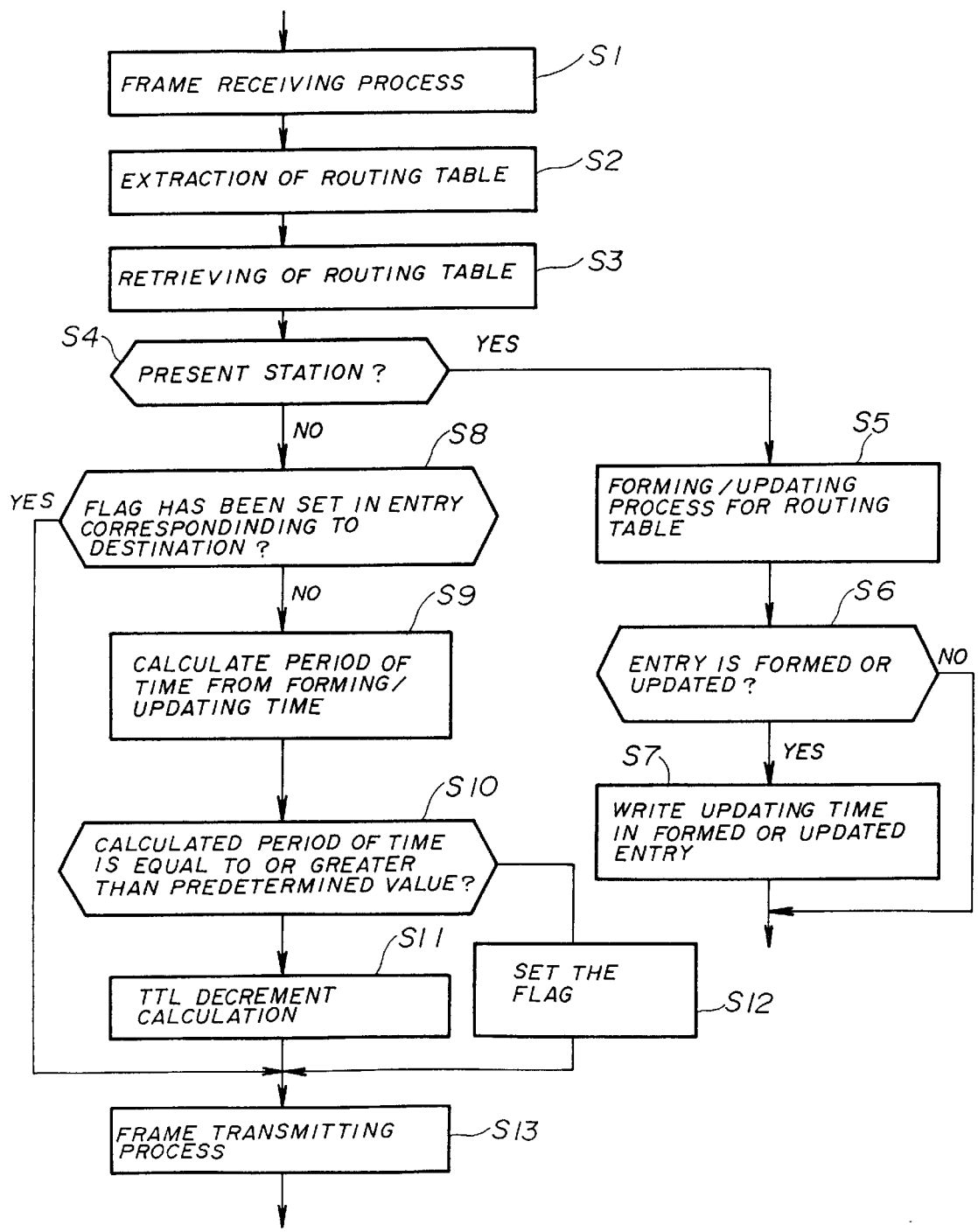
FIG. 12 is a flowchart illustrating a second example of processes in the frame relay system.

In the example 2, a process is executed in accordance with a procedure shown in FIG. 12. In this example, the routing table 21A is formed as shown in FIG. 13. The routing table 21A has destination addresses and the output ports (see FIG. 4) and further has an area in which a forming/updating time for each entry should be written and an area in which flags indicating the entries has been updated should be written. Referring to FIG. 13, the routing table 21A is provided with a destination address area 21a, an output port area 21b, an updating time area 21c and a flag area 21d.

(Updating of the Routing Table)

The frame receiving unit 4 receives a frame from the network and converts the frame format of the received frame into a frame format suitable for the system (S1).

The destination address extracting unit 6 extracts a destination address from the received frame (S2).

The table retrieving block 22 retrieves the routing table 21A indicating the relationship between the destination addresses and the output ports using the destination address extracted from the received frame as a key (S3).

It is checked whether the destination address corresponds to the present system (S4).

When it is determined that the received frame is the path information frame, the table forming/updating discrimination block 26 carries out a forming/updating process for the routing table 21A (S5).

It is further checked whether an entry in the routing table 21A is formed or updated (S6). If an entry is formed or updated, the flag in the entry is reset and an updating time is written in the updating time area 21c (S7).
(Frame Relay Operation)

The frame receiving unit 4 receives a frame from the network and converts the frame format of the received frame into a frame format suitable for the system (S1).

The destination address extracting unit 6 extracts a destination address from the received frame (S2).

The table retrieving block 22 retrieves the routing table 21A indicating the relationship between the destination addresses and the output ports using the destination address extracted from the received frame as a key (S3) and decides a corresponding output port.

It is then checked whether the destination address corresponds to the present system (S4). If the destination address does not correspond to the present system (S4), the forming/updating checking block 25 checks whether the flag in the flag area 21d of the entry (the output port) hit in retrieving of the routing table 21A has been set (S8).

If the flag has not yet been set, a forming/updating time of the entry is read out and a period of time from the forming/updating time to the resent time indicated by the timer 24 is calculated (S9).

If the calculated period of time is not equal to or greater than the predetermined value, instructions for the TTL decrement calculation are supplied to the frame relay control unit 10. If the period of time that has elapsed from a time at which the entry was formed or updated is greater than the predetermined value, the flag indicating that the updating process has been completed is set in the flag area 21d (S12).

When the frame relay control unit 10 receives the instructions from the forming/updating checking block 25, the frame relay control unit causes the TTL decrement block 12 to carry out the TTL decrement calculation (S11). Frame data is supplied to the frame transmitting unit 5 of the output port decided by the table retrieving block 22.

The frame transmission unit 5 converts the frame format of the frame supplied from the frame relay control unit 10 into a frame format suitable for the network and outputs the frame data to the network (S13).

According to the above example, only when the calculated period of time is equal to or less than the predetermined value, the TTL decrement calculation is performed. On the other hand, when the calculated period of time is greater than the predetermined value, the TTL decrement calculation is not performed, but only the flag is set. As a result, the fast relay process can be performed and the frames is prevented from being circulated through the network.

(3) The Example 3

In this example, when an entry (a path) is formed or updated, a time at which the entry is formed or updated (the forming/updating time) is written in the routing table and the flag in the entry is reset. The routing table is successively monitored. The period of time that has elapsed from a time at which entry having the flag which has been not yet set was formed or updated is calculated. In the frame relay operation, when the flag of the entry hit in retrieving of the routing table has not yet been set, the TTL decrement calculation is carried out.

In this example, the routing table 21A is successively monitored and an entry is detected for which the period of time that has elapsed from a time at which the entry was formed or updated is equal to or greater than the predetermined value. As a result, in the frame relay operation, it can be determined, by only discrimination of the flag, whether the TTL decrement calculation should be carried out.

In the example 3, a process is executed in accordance with a procedure shown in FIG. 14. In this example, the routing table 21A is formed as shown in FIG. 15. The routing table 21A has an area in which a forming/updating time for each entry should be written and an area in which flags indicating the entries has been updated should be written. Referring to FIG. 15, the routing table 21A is provided with a destination address area 21a, an output port area 21b, an updating time area 21c and a flag area 21d.
(Updating of the Routing Table)

The frame receiving unit 4 receives a frame from the network and converts the frame format of the received frame into a frame format suitable for the system (S1).

The destination address extracting unit 6 extracts a destination address from the received frame (S2).

The table retrieving block 22 retrieves the routing table 21A indicating the relationship between the destination addresses and the output ports using the destination address extracted from the received frame as a key (S3).

The system checks whether the destination address corresponds to the present system (S4). The system recognizes, based on the checking result, that the destination is the present system.

If the received frame is a path information frame, the table forming/updating discrimination block 25 updates the routing table 21A (S5).

Further, it is checked whether an entry in the routing table has been formed or updated (S6). If an entry in the routing table has been formed or updated, the flag in the entry is reset and a forming/updating time is written with reference to the timer 24 (S7). When it is determined, in step S6, that any entry is neither formed nor updated, the step S7 is not performed.
(The Operation of the Forming/Updating Checking Block 25)

The forming/updating checking block 25 successively carries out the following process.

It is checked whether the flag in the flag area 21d for an entry is set (S11).

If the flag is not set, the period of time that has elapsed from a time at which the entry was formed or updated is calculated with reference to the timer 24 (S12).

It is then checked whether the elapsing time calculated above is equal to or greater than the predetermined value (S13). If the elapsed time is equal to or greater than the predetermined value, the flag in the flag area 21d is set (S14).

The next entry which should be processed is selected (if the processed entry is the last entry, the first entry is selected) and the above process from the step S11 is repeated for the selected entry (S15). If it is determined, in the step S11, that the flag has been set, the step S15 is performed in the same manner as in the above case.
(Frame relay Operation)

The frame receiving unit 4 receives a frame from the network and converts the frame format of the received frame into the frame format suitable for the system (S1).

The destination address extracting unit 6 extracts a destination address from the received frame (S2).

The table retrieving block 22 retrieves the routing table 21A indicating the relationship between the destination addresses and the output ports using the destination address extracted from the received frame as a key (S3) so as to decide an output port.

The system checks whether the destination address corresponds to the present system (S4). If the destination address does not correspond to the present system, the forming/updating checking block 25 checks whether the flag in the flag area 21d has been set for the entry hit in retrieving of the routing table 21A (S8).

If the flag in the flag area 21d has not yet been set, the forming/updating checking block 25 supplies instructions for carrying out the TTL decrement calculation to the frame relay control unit 10.

When the frame relay control unit 10 receives the instructions from the forming/updating checking block 25, the frame relay control unit 10 causes the TTL decrement block 12 to carry out the TTL decrement calculation (S9). Frame data is supplied from the frame forwarding block 11 to the frame transmitting unit 5 of the output port decided from the routing table 21A.

The frame transmitting unit 5 converts the frame format of the frame into a frame format suitable for the network and outputs the frame data to the network (S10).

According to the example 3, in the frame relay operation, only when the flag of the entry hit in retrieving of the routing table is not set, the TTL decrement calculation is carried out. Thus, the fast relay operation can be carried out and the frame can be prevented from being circulated through the network.

(4) The Example 4

In this example, for each entry in the routing table 21A, a flag indicating that the updating process has been completed is provided. When an entry (a path) is formed or updated, the flag of the entry is reset. The flag of each entry in the routing table 21A is set at predetermined intervals. In the relay operation, only when the flag of an entry hit in retrieving of the routing table 21A is not set, the TTL decrement calculation is carried out and the frame is relayed. Since the flag of each entry is set at the predetermined intervals, it can be determined based on the state of the flag whether the TTL decrement calculation should be carried out.

Figure 16:
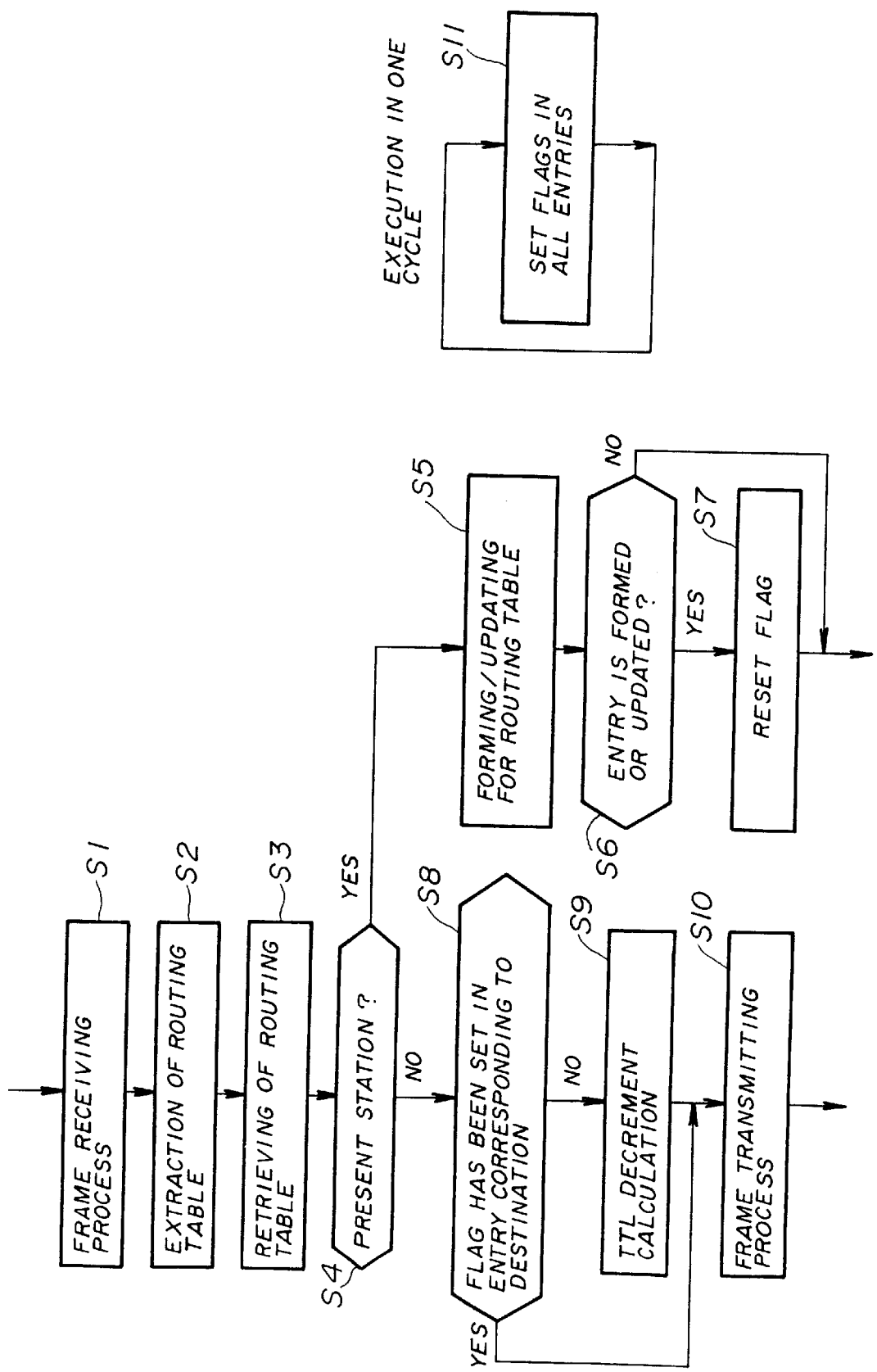
FIG. 16 is a flowchart illustrating a fourth example of processes in the frame relay system.

In the example 4, a process is executed in accordance with a procedure shown in FIG. 16. In this example, the routing table 21A is formed as shown in FIG. 17. The routing table 21A has the destination address area 21a, the output port area 21b and the flag area 21d.

(Updating of the Routing Table)

The frame receiving unit 4 receives a frame from the network and converts the frame format of the received frame into a frame format suitable for the system (S1).

The destination address extracting unit 6 extracts a destination address from the received frame (S2).

The table retrieving block 22 retrieves the routing table 21A indicating the relationship between the destination addresses and the output ports using the destination address extracted from the received frame as a key (S3).

It is then checked whether the destination address corresponds to the present system (S4). For example, it is assumed that the destination address corresponds to the present system.

If the frame transmitted to the present system is a path information frame, the table forming/updating discrimination block 26 updates the routing table 21A (S5).

Further, in a case where an entry in the routing table 21A is formed or updated, the forming/updating checking block 25 resets the flag in the flag area 21d for the entry (S7).

(Operation of the Forming/Updating Checking Block)

In addition, the forming/updating checking block 25 sets the flags of all the entries in the routing table 21A at predetermined intervals (S11).

(Frame Relay Operation)

The frame receiving unit 4 receives a frame from the network and converts the frame format of the received frame into a frame format suitable for the system (S1).

The destination address extracting unit 6 extracts a destination address from the received frame (S2).

The table retrieving block 22 retrieves the routing table 21A indicating the relationship between the destination addresses and the output ports using the destination address extracted from the received frame as a key and decides an output port (S3).

It is then checked whether the destination address corresponds to the present system (S4). If the destination address does not correspond to the present system, the forming/updating checking block 25 checks whether the flag in the flag area 21d for the entry (the output port) hit in retrieving of the routing table 21A is set (S8).

If the flag in the flag area 21d for the entry is not set, instructions for the TTL decrement calculation are supplied to the frame relay control unit 10.

When the frame relay control unit 10 receives the instructions, the TTL decrement calculation is carried out by the TTL decrement block 12 (S9).

The frame transmitting unit 5 converts the frame format of the frame supplied from the frame forwarding block 11 of the frame relay control unit 10 into a frame format suitable for the network and outputs the frame data to the network (S10).

According to the above example, only when the flag of the entry hit in retrieving of the routing table is not set, the TTL decrement calculation is carried out. Thus, the fast relay operation can be performed and the frames are not prevented from being circulated through the network.

(5) The Example 5

In this example, for each entry in the routing table 21A, a flag indicating that the updating process has been completed is provided. When an entry (a path) is formed or updated, the flag of the entry is reset and the timer 24 is caused to start from a value of "0". When the value of the timer 24 reaches a predetermined value, the flags for all the entries in the routing table 21A are reset. In the frame relay operation, only when the flag of an entry hit in retrieving of the routing table 21A is not set, the TTL decrement calculation is performed and the frame is relayed.

In the frame relay operation, it can be determined based only on the state of the flag whether the TTL decrement calculation should be performed. Further, although a case where the flag is not set is continued for a period of time greater than a predetermined value can not be guaranteed in the system according to the example 4, the system according to the example 5 guarantees such a case by resetting the value of the timer 24 to "0" and starting the timer 24 again.

Figure 18:
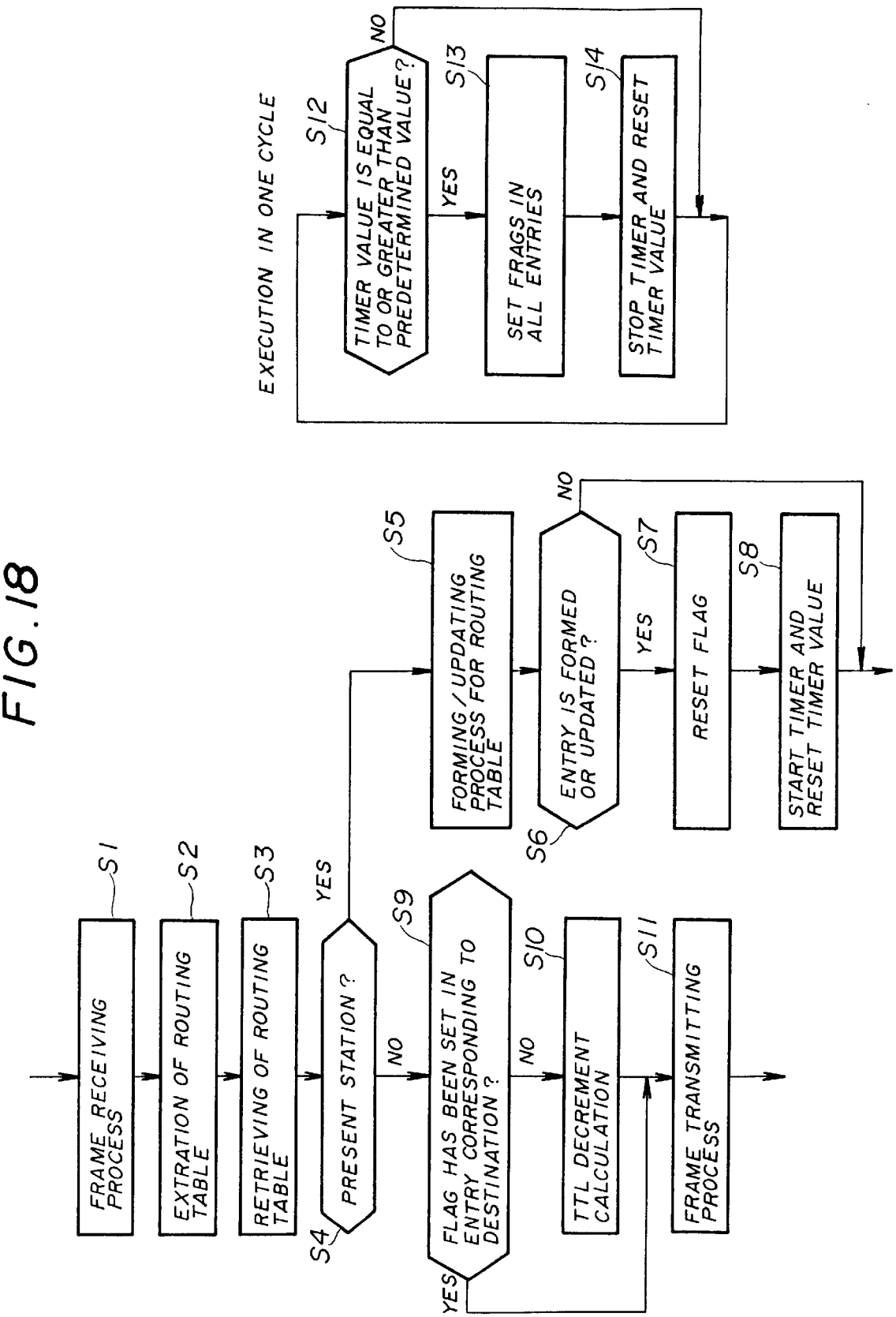
FIG. 18 is a flowchart illustrating a fifth example of processes in the frame relay system.

In the example 5, a process is executed in accordance with a procedure shown in FIG. 18. In this example, the routing table 21A is formed as shown in FIG. 19. The routing table 21A has the destination address area 21a, the output port area 21b and the flag area 21d.

(Updating of the Routing Table)

The frame receiving unit 4 receives a frame from the network and converts the frame format of the received frame into a frame format suitable for the system (S1).

The destination address extracting unit 6 extracts a destination address from the received frame (S2).

The table retrieving block 22 retrieves the routing table 21A indicating the relationship between the destination addresses and the output ports using the destination address extracted from the received frame as a key (S3).

The table retrieving block 22 checks whether the destination address corresponds to the present system (S4). For example, it is assumed that the destination address corresponds to the present system.

If the received frame is a path information frame, the table forming/updating discrimination block 26 updates the routing table 21A (S5).

It is then checked whether an entry in the routing table 21A has been formed or updated (S6). If an entry in the routing table 21A has been formed or updated, the forming/updating checking block 25 resets the flag in the flag area 21d (S7). The timer 24 is then reset to a value of "0" and started again (S8).

(Operation of the Forming/Updating Checking Block)

The forming/updating checking block 25 successively performs the following process.

The forming/updating checking block 25 checks the timer 24 and determines whether the value of the timer 24 is equal to or greater than a predetermined value (S12).

If the value of the timer 24 is equal to or greater than the predetermined value, the flags in the flag area 21d for all the entries in the routing table 21A are set (S13). The timer 24 is then reset to a value of "0" and the operation of the timer 24 is stopped (S14).

(Frame Relay Operation)

The frame receiving unit 4 receives a frame from the network and converts the frame format of the received frame into a frame format suitable for the system (S1).

The destination address extracting unit 6 extracts a destination address from the received frame (S2).

The table retrieving block 22 retrieves the routing table 21A indicating the relationship between the destination addresses and the output ports using the destination address extracted from the received frame as a key and decides an output port (S3).

It is then checked whether the destination address corresponds to the present system (S4). If the destination address does not corresponds to the present system, the forming/updating checking block 25 checks whether the flag of the entry (the output port) hit in retrieving of the routing table 21A has been set (S9).

If the flag has not yet been set, the forming/updating checking block 25 supplies instructions for the TTL decrement calculation to the frame relay control unit 10.

When the frame relay control unit 10 receives the instructions from the forming/updating checking block 25, the TTL decrement calculation is carried out by the TTL decrement block 12 (S10). Frame data is supplied to the frame transmitting unit 5 of the output port decided by the table retrieving block 22.

The frame transmitting unit 5 converts the frame format of the frame into a frame format suitable for the network and outputs the frame data to the network (S11).

According to the above example, only when the flag of the entry hit in retrieving of the routing table 21A has not yet been set, the TTL decrement calculation is carried out. Thus, the fast relay operation can be performed and the frame can be prevented from being circulated through the network.

(6) The Example 6

In this example, for each of the entries in the routing table 21A, a completely updated flag indicating that an entry has been formed or updated and an updating flag indicating that an entry is being updated are provided. When an entry (a path) is formed or updated, the completely updated flag and the updating flag are reset. The routing table 21A is monitored at predetermined intervals. In a case where neither the completely updated flag nor the updating flag are set, the updating flag is set. In a case where only the completely updated flag is not set, the completely updated flag is set. In the frame relay operation, only when the completely updated flag of an entry hit in retrieving of the routing table 21A is not set, the TTL decrement calculation is performed and the frame is relayed.

The routing table 21A is monitored at predetermined intervals. Sets of the updating flags and the completely updated flags for respective entries are successively set, so that it is guaranteed that a period of time for which each of the completely updated flags is not set is equal to or greater than a predetermined value. In addition, in the frame relay operation, it can be determined, based on only the state of the completely updated flag, whether the TTL decrement calculation should be carried out.

Figure 20:
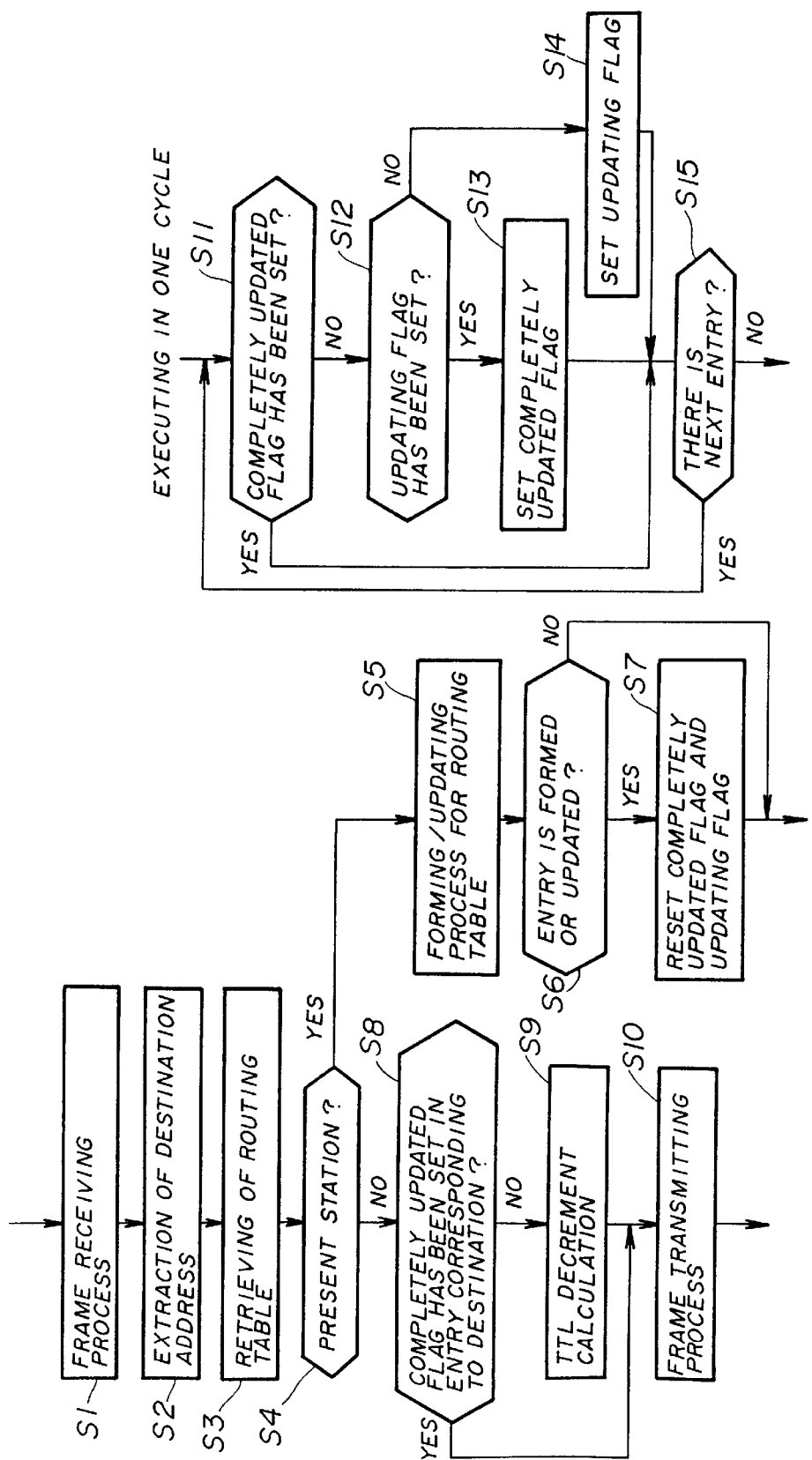
FIG. 20 is a flowchart illustrating a sixth example of processes in the frame relay system.

In the example 6, a process is executed in accordance with a procedure shown in FIG. 20. In this example, the routing table 21A is formed as shown in FIG. 21. The routing table 21A has the destination address area 21a, the output port area 21b, a completely updated flag area 21d and an updating flag area 21e.

(Updating of the Routing Table)

In this example, the routing table 21A has, as shown in FIG. 21, not only the destination addresses and the output ports but also the completely updated flags indicating that the forming/updating process for the entry has been completed and the updating flags indicating that the forming/updating process for the entry has not yet been completed.

The frame receiving unit 4 receives a frame from the network and converts the frame format of the received frame into a frame format suitable for the system (S1).

The destination address extracting unit 6 extracts a destination address from the received frame (S2).

The table retrieving block 22 retrieves the routing table 21A indicating the relationship between the destination addresses and the output ports using the destination address extracted from the received frame as a key (S3).

It is then checked whether the destination address corresponds to the present system (S4). For example, it is assumed that the destination address corresponds to the present system.

If the received frame is a path information frame, the table forming/updating discrimination block 26 updates the routing table 21 (S5).

Further, it is checked whether an entry has been formed or updated in the routing table 21A (S6). If an entry has been formed or updated in the routing table 21A, the flags in the completely updated flag area 21d and the updating flag area 21e are reset (S7).

(Operation of the Forming/Updating Checking Block)

The forming/updating checking block 25 periodically performs the following process.

The forming/updating checking block 25 checks the flags in the completely updated flag area 21e for each entry and determines whether the flag has been set (S11).

It is further checked whether the flags in the updating flag area 21e for entries having the completely updated flags which has not yet been set has been set (S12).

In a case where the flag in the completely updated flag area 21d has not yet been set and the flag in the updating flag area 21e has been set, the flag in the completely updated flag area 21d is set (S13).

In a case where the flags in neither the completely updated flag area 21e nor the updating flag area 21e has been set, the flag in the updating flag area 21e is set (S14).

The next entry which should be processed is selected and the above process from the step S11 is repeated for the selected entry (S15).

If the processed entry is the last entry, the first entry in the routing table 21A is selected. After a predetermined period of time elapses, the above process from the step S11 is repeated for the first entry.
(Frame Relay Operation)

In this case, the same frame operation as in the example 3 is performed.

The frame receiving unit 4 receives a frame from the network and converts the frame format of the received frame into a frame format suitable for the system (S1).

The destination address extracting unit 6 extracts a destination address from the received frame (S2).

The table retrieving block 22 retrieves the routing table 21A indicating the relationship between the destination addresses and the output ports using the destination address extracted from the received frame as a key and decides an output port (S3).

The system checks whether the destination address corresponds to the present system (S4). If the destination address does not correspond to the present system, the forming/updating checking block 25 checks whether the flag in the completely updated flag area 21d for the entry (the output port) hit retrieving of the routing table 21A has been set (S8).

If the flag in the completely updated flag has not yet been set, instructions for the TTL decrement calculation are supplied to the frame relay control unit 10.

When the frame relay control unit 10 receives the instructions from the forming/updating checking block 25, the frame relay control unit 10 causes the TTL decrement block 12 to carry out the TTL decrement calculation (S9). The frame data is then supplied to the frame transmitting unit 5 of the output port decided by the table retrieving block 22.

The frame transmitting unit 5 outputs the frame format of the frame into the frame format suitable for the network and outputs the frame data to the network (S10).

According to the above example, only when the completely updated flag of an entry hit in retrieving of the routing table 21A in the frame relay operation has been set, the TTL decrement calculation is carried out and the frame is relayed. Thus, the fast frame relay operation can be performed and the frame can be prevented from being circulated through the network.

(7) The example 7

In this example, each entry in the routing table is provided with a static path flag indicating the entry corresponds to a static path. The static path flag is set for a relaying path (an entry) which is set by an administrator. In the frame relay operation, if the static path flag of an entry hit in retrieving of the routing table 21A has been set, the TTL decrement calculation is carried out and the frame is relayed. The relay system in the example 7 is formed as shown in FIG. 7.

In the example 7, the routing table 21A is formed as shown in FIG. 22. The routing table 21A has the destination address area 21a, the output port area 21b and the static path flag area 21f.
(Forming of the Routing Table)

An administrator of the relay system can decide a relaying path for a specific address or a sets of addresses corresponding to a specific condition. The relaying path can be recorded in the routing table 21A. The static path flag of an entry corresponding to the recorded relaying path is set.
(Frame Relay Operation)

The frame receiving unit 4 receives a frame from the network and converts the frame format of the received frame into a frame format suitable for the system.

The destination address extracting unit 6 extracts a destination address from the received frame.

The table retrieving block 22 retrieves the routing table 21A indicating the relationship between the destination addresses and the output ports using the destination address extracted from the received frame as a key and decides an output port.

The static path determination block 27 checks whether the flag in the static flag area 21f for an entry hit in retrieving of the routing table 21A has been set.

When the flag in the static flag area has been set, the static path determination block 27 supplies instructions for the TTL decrement calculation to the frame relay control unit 10.

When the frame relay control unit 10 receives the instructions from the static path determination block 27, the TTL decrement calculation is carried out by the TTL decrement block 12. Frame data is supplied from the frame forwarding block 11 to the frame transmitting unit 5 of the output port decided by the table retrieving block 22.

The frame transmitting unit 5 converts the frame format of the frame into a frame format suitable for the network and outputs the frame data to the network.

According to the above example, when the static path flag of an entry hit in retrieving of the routing table 21A has been set, the TTL decrement calculation is carried out and the frame is relayed. Thus, the frames can be prevented from being circulated through the network caused by the static paths.

(8) The Example 8

In this example, when a frame is relayed, it is determined that the frame includes a multicast address, a specific terminal address or a specific protocol identification number which frame should be applied with the TTL decrement calculation. If so, the TTL decrement calculation is carried out and the frame is then relayed.

Figure 1:
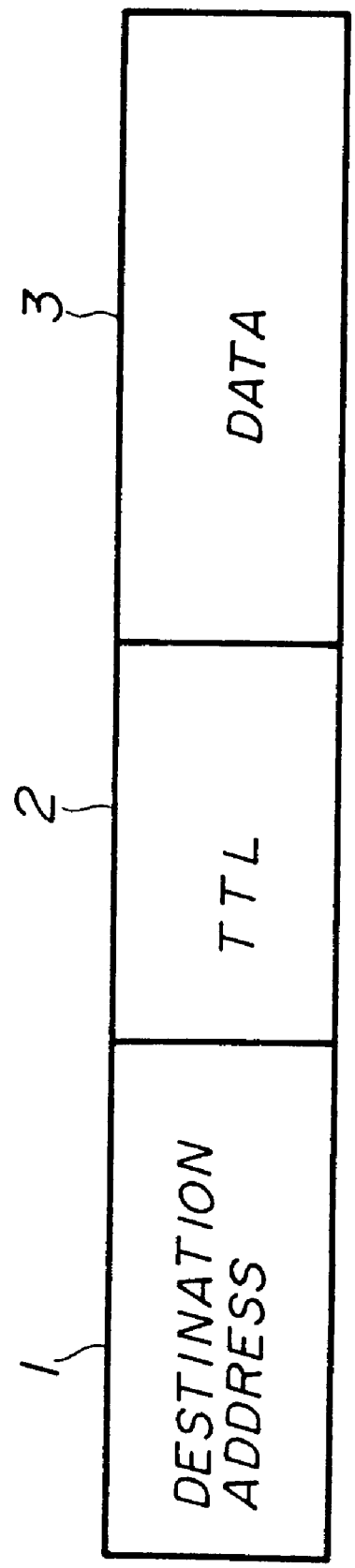
FIG. 1 is a diagram illustrating a conventional format of a frame.
Figure 23:
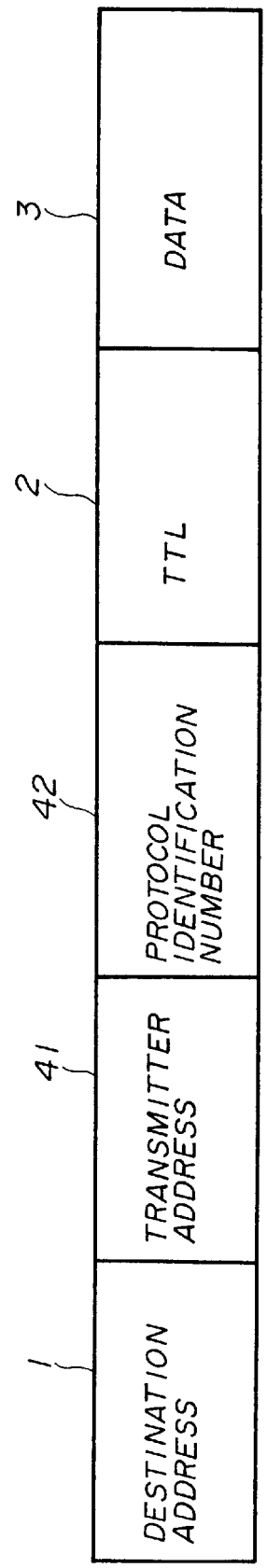
FIG. 23 is a diagram illustrating a format of a frame.

In a case where a frame having a format as shown in FIG. 23 which differs from that shown in FIG. 1 is relayed, a transmitter address and a type of protocol may be selected as information to be checked in the same manner as the destination address. In the example 8, the frame format is formed as shown in FIG. 23. The frame includes a destination address 1, a transmitter address, a protocol identification number 42, a frame time-to-live (TTL) and data 3.

A description will now be given of a case where it is determined whether a frame has a multicast address or a specific address as the destination address or a specific protocol identification number. The frame relay system in this example is formed as shown in FIG. 8.
(Frame relay Operation)

The frame receiving unit 4 receives a frame from the network and converts the format of the received frame into a format suitable for the system The destination address extracting unit 6 extracts a destination address from the received frame.

The table retrieving block 22 retrieves the routing table 21A indicating the relationship between the destination addresses and the output ports using the destination address extracted from the received frame as a key and decides an output port.

The frame discrimination block 28 determines whether the destination address 1 of the received frame is a multicast address or a specific address or whether the protocol identification number of the received frame is the specific protocol identification number. If the destination address 1 of the received frame is the multicast address or the specific address, instructions for the TTL decrement calculation are supplied to the frame relay control unit 10.

When the frame relay control unit receives the instructions from the frame discrimination block 28, the frame control unit 10 causes the TTL decrement block 12 to carry out the TTL decrement calculation. Frame data is supplied from the frame forwarding block 11 to the frame transmitting unit 5 of the output port decided by the table retrieving block 22.

The frame transmitting unit 5 converts the frame format of the frame into a frame format suitable for the network and outputs the frame data to the network.

According to the example 8, it is determined whether the received frame is a frame, to be applied with the TTL decrement calculation, including a multicast address or a specific terminal address or whether the received frame is a frame belonging to a specific protocol. If the received frame is such a frame, the TTL decrement calculation is carried out and the received frame is relayed. As a result, the disadvantages caused by not carrying out the TTL decrement calculation in the examples 1 through 6 can be eliminated.

(9) The Example 9

In this example, each entry of the routing table is provided with an area in which a decrement compulsion flag is written indicating the TTL decrement calculation should be compulsorily carried out. The decrement compulsion flag of an entry corresponds to a path to which a frame should be relayed after the TTL decrement is carried out. In the frame relay operation, if the decrement compulsion flag of an entry hit in retrieving of the routing table has been set, the TTL decrement calculation is carried out and the frame is relayed. Thus, it can be specified whether the TTL decrement calculation should be carried out for each destination. In this example, the frame relay system is formed as shown in FIG. 9.

Figure 24:
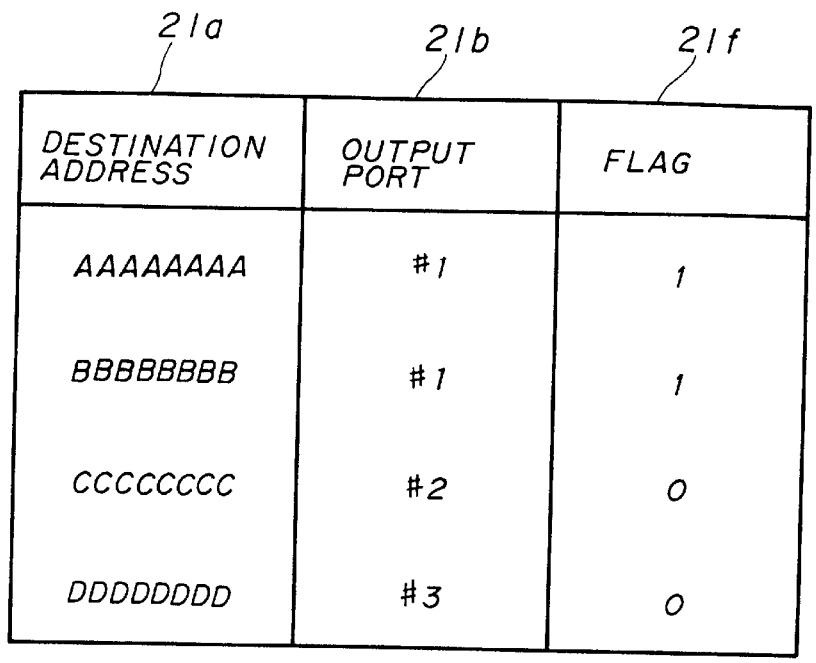
FIGS. 24 and 25 are diagrams illustrating other routing tables.

In the example 9, the routing table 21A is formed as shown in FIG. 24. The routing table 21A has the destination address area 21*a* and the compulsion decrement flag area 21*g*.

(Forming of the Routing Table)

In a case where a frame should be relayed to a specific destination, an administrator can cause the system to compulsorily carry out the TTL decrement calculation. In this case, the decrement compulsion flag in the area 21*g* for an entry is set.

(Frame Relay Operation)

The frame receiving unit 4 receives a frame from the network and converts the format of the received frame into a frame suitable for the system.

The destination address extracting unit 6 extracts a destination address from the received frame.

The table retrieving block 22 retrieves the routing table 21A indicating the relationship between the destination addresses and the output ports using the destination address extracted from the received frame as a key and decides an output port.

The output port determination block 29 checks whether the decrement compulsion flag of an entry hit in retrieving of the routing table 21A has been set.

If the compulsion decrement flag has been set, the output port determination block 29 supplies instruction for the TTL decrement calculation to the frame relay control unit 10.

When the frame relay control unit 10 receives the instructions from the output port determination block 29, the frame relay control unit 10 causes the TTL decrement block 12 to carry out the TTL decrement calculation. Frame data is supplied from the frame forwarding block 11 to the frame transmitting unit 5 of the output port decided by the table retrieving block 22.

The frame transmitting unit 5 converts the format of the frame into a format suitable for the network and outputs the frame to the network.

According to the example 9, when the decrement compulsion flag in the area 21*g* of the entry hit in retrieving of the routing table 21A has been set, the TTL decrement calculation is carried out and the frame is relayed. Thus, the disadvantages caused by not carrying out the TTL decrement calculation in the examples 1 through 6 can be eliminated.

(10) The Example 10

Figure 25:
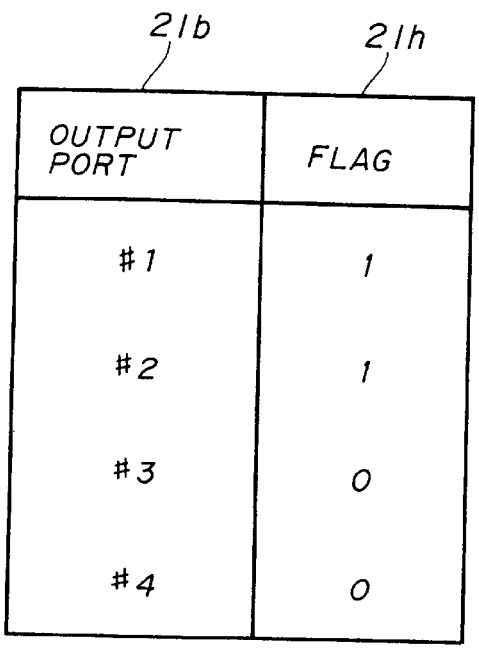

In this example, the system is provided with a table, separated from the routing table, indicating a relationship between output ports and decrement compulsion flags indicating whether the TTL decrement calculation is carried out. A decrement compulsion flag of an entry corresponding to an output port through which a frame should be relayed after the TTL decrement calculation is carried out. The table used in the example 10 is formed as shown in FIG. 25. This table is separated from the routing table 21A and has an area 21*b* for the output ports and an area 21*h* for the decrement compulsion flag. This table is referred to as a TTL decrement compulsion table.

When the decrement compulsion flag of the output port decided by retrieving of the routing table has been set in the frame relay operation, the TTL decrement calculation is carried out and the frame is relayed. According to this, it can be specified whether the TTL calculation should be carried out for each output port. The frame relay system according to this example is formed as shown in FIG. 9.

(Forming of the Routing Table)

In a case where a frame is relayed to a specific output port, an administrator of the frame relay system can cause the system to compulsorily carry out the TTL decrement calculation. In this case, the decrement compulsion flag in the area 21*f* of an entry corresponding to the output port is set at "1".

(Frame Relay Operation)

The frame receiving unit 4 receives a frame from the network and converts the format of the received frame into a frame suitable for the system.

The destination address extracting unit 6 extracts a destination address from the received frame.

The table retrieving block 22 retrieves the routing table 21A indicating the relationship between the destination addresses and the output ports using the destination address extracted from the received frame as a key and decides an output port.

The output port determination block 29 checks, with reference to the TTL decrement table, whether the decrement compulsion flag of the output port decided by the table retrieving block 22 has been set.

If the decrement compulsion flag has been set, instructions for the TTL decrement calculation are supplied to the frame relay control unit 10.

When the frame relay control unit 10 receives the instructions from the output port determination block 29, the frame relay control unit 10 causes the TTL decrement block 12 to carry out the TTL decrement calculation. Frame data is supplied from the frame forwarding block 11 to the frame transmitting unit 5 of the output port decided by the table retrieving block 22.

The frame transmitting unit 5 converts the format of the frame data from the frame relay control unit 10 into a format suitable for the network and outputs the frame data to the network.

According to the example 10, when the decrement compulsion flag for the output port decided by retrieving of the routing table has been set, the TTL decrement calculation is carried out and the frame is relayed. Thus, the disadvantages caused by not carrying out the TTL decrement calculation in the examples 1 through 6 can be eliminated.

As has been described above, according to the present invention, only when the routing table is formed or updated so that circulation of a frame through the network occurs, the TTL decrement calculation is carried out. Thus, a relayed frame can be prevented from being circulated through the network. In addition, the number of times the TTL decrement calculation that causes the delay of the frame relay operation to be carried out is minimized. Thus, the fast frame relay operation can be performed.

The present invention is not limited to the aforementioned embodiments, and other variations and modifications may be made without departing from the scope of the claimed invention.

What is claimed is:

1. A frame relay system which relays a received frame having a destination address and a frame TTL indicating a term of life of the received frame, said system comprising:
   a routing table having entries, each of the entries indicating a relationship between a destination address and a control information item;
   retrieving means for retrieving said routing table based on a destination address included in the received frame; and
   frame control means for carrying out a decrement calculation of the frame TTL of the received frame when a period of time has elapsed from a time at which an entry hit in retrieving of said routing table by said retrieving means was formed or updated is less than a predetermined value and for not carrying out the decrement calculation of the frame TTL when the period of time period is equal or greater than the predetermined value.

2. The frame relay system as claimed in claim 1, wherein each of the entries in said routing table has an area in which a time at which the entry is formed or updated should be written, and wherein said frame control means includes:
   means for writing a forming/updating time at which an entry is formed or updated in said routing table in the area of the entry when the entry is formed or updated; and
   calculation means for, in a frame relay operation, calculating the period of time that has elapsed from a time at which an entry hit in retrieving of said routing table was formed or updated based on the forming/updating time of the entry, wherein said frame control means carries out the decrement calculation of the frame TTL when the calculated period of time is equal to or less than the predetermined value.

3. The frame relay system as claimed in claim 1, wherein each of the entries in said routing table has a first area in which a time at which the entry is formed or updated should be written and a second area in which a flag indicating that an updating process for the entry has been completed should be written, and wherein said frame control means includes:
   means for writing a forming/updating time at which an entry is formed or updated in said routing table in the area of the entry when the entry is formed or updated and resetting the flag; and
   calculation means for, in a frame relay operation, calculating the period of time that has elapsed from a time at which an entry hit in retrieving of said routing table was formed or updated based on the forming/updating time of the entry if the flag of the entry has not yet been set, wherein said frame control means carries out the decrement calculation of the frame TTL when the calculated period of time is equal to or less than the predetermined value, and said frame control means does not carry out the decrement calculation of the frame TTL and sets the flag when the calculated period of time is equal to or greater than the predetermined value.

4. The frame relay system as claimed in claim 1, wherein each of the entries in said routing table has a first area in which a time at which the entry is formed or updated should be written and a second area in which a flag indicating an updating process for the entry has been completed should be written, and wherein said frame control means includes:
   means for writing a forming/updating time at which an entry is formed or updated in said routing table in the area of the entry when the entry is formed or updated and resetting the flag;
   calculation means for monitoring flags for the respective entries in said routing table and calculating a period of time that has elapsed from a time at which an entry for which the flag has not yet been set was formed or updated; and
   means for setting the flag of an entry in which the calculated period of time is equal to or greater than a predetermined value, wherein said frame control means carries out the decrement calculation of the frame TTL when the flag of the entry hit in retrieving of said routing table has not yet been set.

5. The frame relay system as claimed in claim 1, wherein each of the entries in said routing table has an area in which a flag indicating that an updating process for the entry has been completed should be written, and wherein said frame relay control means includes:
   means for resetting the flag of an entry when the entry is formed or updated; and
   means for setting flags for all the entries at predetermined intervals, wherein said frame relay means carries out the decrement calculation of the frame TTL when the flag of an entry hit in retrieving of said routing table has not yet been set in a frame relay operation.

6. The frame relay system as claimed in claim 1, wherein each of the entries in said routing table has an area in which a flag indicating that an updating process for the entry has been completed should be written, and wherein said frame relay control means includes:
   a timer;
   means for resetting the flag of an entry and starting said timer from zero when the entry is formed or updated; and
   means for setting the flags of all the entries in said routing table when a value of said timer reaches a predetermined value, wherein said frame relay control means carries out the decrement calculation of the frame TTL when the flag of an entry hit in retrieving of said routing table has not yet been set in a frame relay operation.

7. The frame relay system as claimed in claim 1, wherein each of the entries in said routing table has a first area in which a first flag indicating that a updating process for the entry has been completed should be written and a second area in which a second flag indicating that the entry is being updated, and wherein said frame relay control means includes:
   means for resetting the first and second flags of an entry when the entry is formed or updated;

means for monitoring said routing table;

means for setting the second flag of an entry for which it is detected based on a monitoring result that neither the first flag nor the second flag has not yet been set; and means for setting the first flag of an entry for which it is detected based on the monitoring result that only the first flag has not yet been set, wherein said frame relay control means carries out the decrement calculation of the frame TTL when the first flag of an entry hit in retrieving of said routing table has not yet been set in a frame relay operation.

8. The frame relay system as claimed in claim 1, wherein each of the entries in said routing table has an area in which a flag indicating that the entry corresponds to a static path should be written, and wherein said frame relay control means includes:

means for setting the flag of an entry when an administrator of said system specifies the entry corresponding to the static path, wherein said frame relay control means carries out the decrement calculation of the frame TTL when the flag of an entry hit in retrieving of said routing table has been set in a frame relay operation.

9. The frame relay system as claimed in claim 1, wherein said frame relay control means includes:

means for determining whether the received frame includes a multicast address or a specific terminal address which type of address indicates that the decrement calculation of the frame TTL should be carried out for the received frame or whether the received frame is a frame belonging to a specific protocol, wherein said frame relay control means carries out the decrement calculation of the frame TTL when said means determines that the received frame includes the multicast address or the specific terminal address or that the received frame is the frame belonging to the specific protocol.

10. The frame relay system as claimed in claim 1, wherein each of the entries in said routing table has an area in which a flag indicating that the decrement calculation of the frame TTL should be compulsorily carried out, and wherein said frame control means includes:

means for setting the flag of an entry corresponding to a path to which a frame should be relayed after the decrement calculation of the frame TTL is carried out, wherein said frame relay control means carries out the decrement calculation of the frame TTL when the flag of an entry hit in retrieving of said routing table has been set in a frame relay operation.

11. The frame relay system as claimed in claim 10 further comprising:

a table separated from said routing table, said table indicating that each of the output ports is a port for which the decrement calculation of the frame TTL should be carried out; wherein said frame relay control means carries out the decrement calculation of the frame TTL when it is determined with reference to said table that an output port decided by retrieving of said routing table is the port for which the decrement calculation of the frame TTL should be carried out.

* * * * *